(12) United States Patent
Takao et al.

(10) Patent No.: US 8,190,634 B2
(45) Date of Patent: May 29, 2012

(54) IMAGE DISPLAY CONTROLLING APPARATUS, METHOD OF CONTROLLING IMAGE DISPLAY, AND STORAGE MEDIUM

(75) Inventors: Hidenobu Takao, Kawasaki (JP); Hideya Takanashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 11/869,540

(22) Filed: Oct. 9, 2007

(65) Prior Publication Data
US 2008/0086511 A1    Apr. 10, 2008

(30) Foreign Application Priority Data

Oct. 10, 2006  (JP) .................................. 2006-276744
Dec. 6, 2006   (JP) .................................. 2006-329851

(51) Int. Cl.
G06F 7/00   (2006.01)
G06F 17/30  (2006.01)

(52) U.S. Cl. ........................................ 707/781; 382/118
(58) Field of Classification Search .................. 707/758, 707/741, 781, 785; 328/118
See application file for complete search history.

(56) References Cited

U.S. PATENT DOCUMENTS

| | | | | |
|---|---|---|---|---|
| 7,468,747 B2* | 12/2008 | Nakamura et al. | ............ | 348/239 |
| 7,502,795 B1* | 3/2009 | Svendsen et al. | ..................... | 1/1 |
| 7,551,755 B1* | 6/2009 | Steinberg et al. | ............ | 382/118 |
| 7,564,994 B1* | 7/2009 | Steinberg et al. | ............ | 382/118 |
| 2001/0027472 A1* | 10/2001 | Guan | ........................... | 709/203 |
| 2002/0075322 A1* | 6/2002 | Rosenzweig et al. | ......... | 345/835 |
| 2002/0147661 A1* | 10/2002 | Hatakama et al. | .............. | 705/26 |
| 2003/0009569 A1* | 1/2003 | McIntyre et al. | ............. | 709/229 |
| 2003/0016244 A1* | 1/2003 | Hayakawa et al. | ........... | 345/741 |
| 2004/0264810 A1* | 12/2004 | Taugher et al. | ............... | 382/305 |
| 2007/0036468 A1* | 2/2007 | Matsushita et al. | ........... | 382/305 |
| 2008/0108299 A1* | 5/2008 | Hullot et al. | ................. | 455/3.01 |

* cited by examiner

*Primary Examiner* — John R. Cottingham
*Assistant Examiner* — Nicholas Allen
(74) *Attorney, Agent, or Firm* — Canon USA Inc. IP Division

(57) ABSTRACT

An application program package (APP) in a Web server extracts attribute information about an image file registered in a public folder (for example, subject feature information about a subject appearing in the image file). The APP calculates a reference value of the subject feature information from the subject feature information about multiple image files associated with the public folder. The APP determines the subject feature information having the reference value as feature information. The APP acquires a level of similarity between the subject feature information about every image file and the feature information. The APP sets a display mode of the image file registered in the public folder in association with the public folder based on the level of similarity and controls the image file so as to be displayed in the display mode in a client PC.

9 Claims, 28 Drawing Sheets

FIG. 3

```
┌─────────────────────────────────────────────┐
│ Registration Form of Public Album           │
│  ┌─ Name of public album ──────────────┐    │
│  │ ┌─────────────────────────────────┐ │    │──── 131
│  │ │ Sports Festival 2006 Mr. James's class − 5th grade │ │
│  │ └─────────────────────────────────┘ │    │
│  └─────────────────────────────────────┘    │
│                                             │
│  ┌─ Owner ID ──────────────────────────┐    │──── 132
│  │ ┌─────────────────────────────────┐ │    │
│  │ │ Smith.nnnn@mmmm.com             │ │    │
│  │ └─────────────────────────────────┘ │    │
│  │ ┌─────────────────────────────────┐ │    │
│  │ │ Brown.ssss@tttt.com             │ │    │
│  │ └─────────────────────────────────┘ │    │
│  │ ┌─────────────────────────────────┐ │    │
│  │ │ Davis.xxxx@yyyy.com             │ │    │
│  │ └─────────────────────────────────┘ │    │
│  └─────────────────────────────────────┘    │
│                                             │
│            [   OK   ]   [ Cancel ]          │
└─────────────────────────────────────────────┘
                         300
```

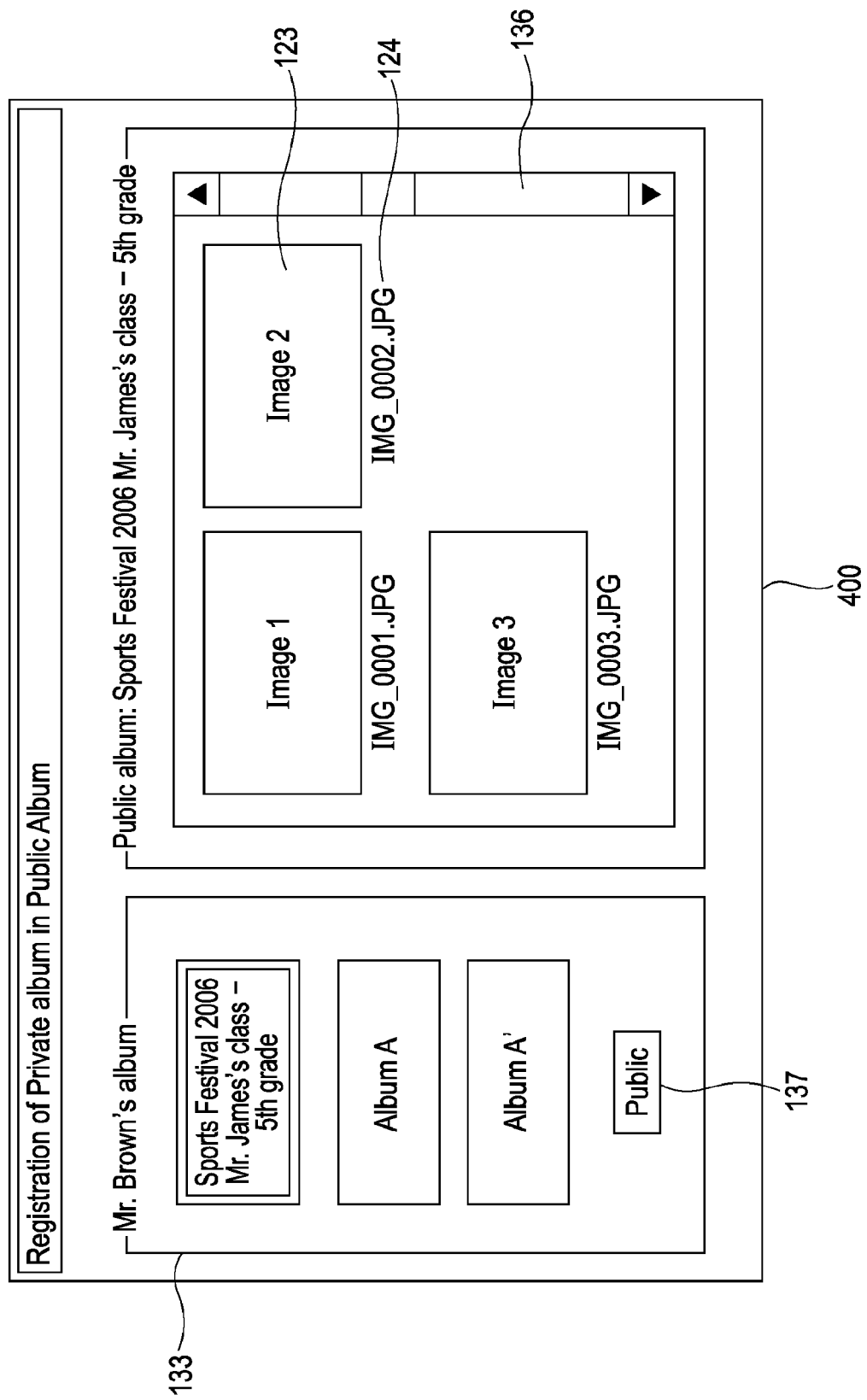

FIG. 12A

| PUBLIC ALBUM | PRIVATE ALBUM | THE NUMBER OF PUBLIC ALBUMS | THE NUMBER OF IMAGES | SUBJECT | THE COUNT OF APPEARANCE | THE COUNT OF APPEARANCE (WEIGHTED) |
|---|---|---|---|---|---|---|
| SPORTS FESTIVAL 2006 MR. JAMES'S CLASS – 5TH GRADE | A | 1 | 100 | a | 70 | 70 |
| | | | | b | 30 | 30 |
| | | | | c1 | 40 | 40 |
| | B | 1 | 150 | a | 30 | 30 |
| | | | | b | 80 | 80 |
| | | | | c1 | 50 | 50 |
| | C | 2 | 200 | a | 40 | 20 |
| | | | | b | 50 | 25 |
| | | | | c1 | 80 | 40 |
| | | | | c2 | 80 | 40 |
| SPORTS FESTIVAL 2006 MS. ADAM'S CLASS – 3RD GRADE | D | 1 | 100 | c2 | 40 | 40 |
| | | | | d | 80 | 80 |

FIG. 12B

| SPORTS FESTIVAL 2006 MS. JAMES'S CLASS – 5TH GRADE | |
|---|---|
| SUBJECT | THE COUNT OF APPEARANCE |
| a | 120 |
| b | 135 |
| c1 | 130 |
| c2 | 40 |
| d | 20 |

FIG. 16A

| IMAGE 1100 | THE COUNT OF ACCESS 1101 | PHOTOGRAPHING DATE/TIME 1102 | SUBJECT 1103 | WEIGHTED VALUE 1104 |
|---|---|---|---|---|
| IMG_0001.JPG | 45 | 5/24/2006 8:01 | a | 45 |
| | | | b | 45 |
| IMG_0002.JPG | 43 | 5/24/2006 8:24 | c | 43 |
| | | | a | 43 |
| IMG_0031.JPG | 39 | 5/24/2006 13:34 | c | 39 |
| IMG_0035.JPG | 38 | 5/24/2006 13:35 | a | 38 |
| ... | | | ... | ... |
| IMG_0231.JPG | 2 | 5/24/2006 10:54 | d | 2 |

FIG. 16B

| SPORTS FESTIVAL 2006 MR. JAMES'S CLASS – 5TH GRADE 1105 | |
|---|---|
| SUBJECT | SUM OF WEIGHTED VALUES |
| a | 436 |
| b | 184 |
| c | 245 |
| d | 57 |

FIG. 21A

| FILE NAME | PHOTOGRAPHING DATE/TIME | PHOTOGRAPHING LOCATION | Ev | PHOTOGRAPHING MODE | TYPE OF CAMERA |
|---|---|---|---|---|---|
| IMG_0001.jpg | 08/12/2006 09:15 | AAA | 5 | AUTOMATIC | CAMERA 1 |
| IMG_0002.jpg | 08/12/2006 09:20 | AAA | 5 | SPORT | CAMERA 1 |
| IMG_0003.jpg | 08/12/2006 09:34 | AAA | 5 | AUTOMATIC | CAMERA 2 |
| IMG_0004.jpg | 08/12/2006 10:32 | AAA | 5 | SPORT | CAMERA 2 |
| IMG_0005.jpg | 08/12/2006 11:45 | BBB | 8 | PORTRAIT | CAMERA 3 |
| IMG_0006.jpg | 08/12/2006 11:48 | AAA | 8 | MANUAL | CAMERA 1 |
| IMG_0007.jpg | 08/12/2006 11:58 | AAA | 8 | AUTOMATIC | CAMERA 2 |
| IMG_0008.jpg | 08/12/2006 12:13 | AAA | 8 | AUTOMATIC | CAMERA 1 |
| IMG_0009.jpg | 08/12/2006 12:33 | AAA | 7 | SPORT | CAMERA 2 |
| IMG_0010.jpg | 08/12/2006 13:49 | AAA | 7 | AUTOMATIC | CAMERA 2 |
| IMG_0011.jpg | 08/12/2006 14:32 | AAA | 7 | MANUAL | CAMERA 1 |
| IMG_0012.jpg | 08/12/2006 14:37 | BBB | 7 | MANUAL | CAMERA 3 |
| IMG_0013.jpg | 08/12/2006 15:21 | AAA | 7 | AUTOMATIC | CAMERA 1 |
| : | : | : | : | : | : |
| IMG_9999.jpg | 08/15/2006 17:03 | CCC | 5 | MANUAL | CAMERA 1 |

FIG. 21B

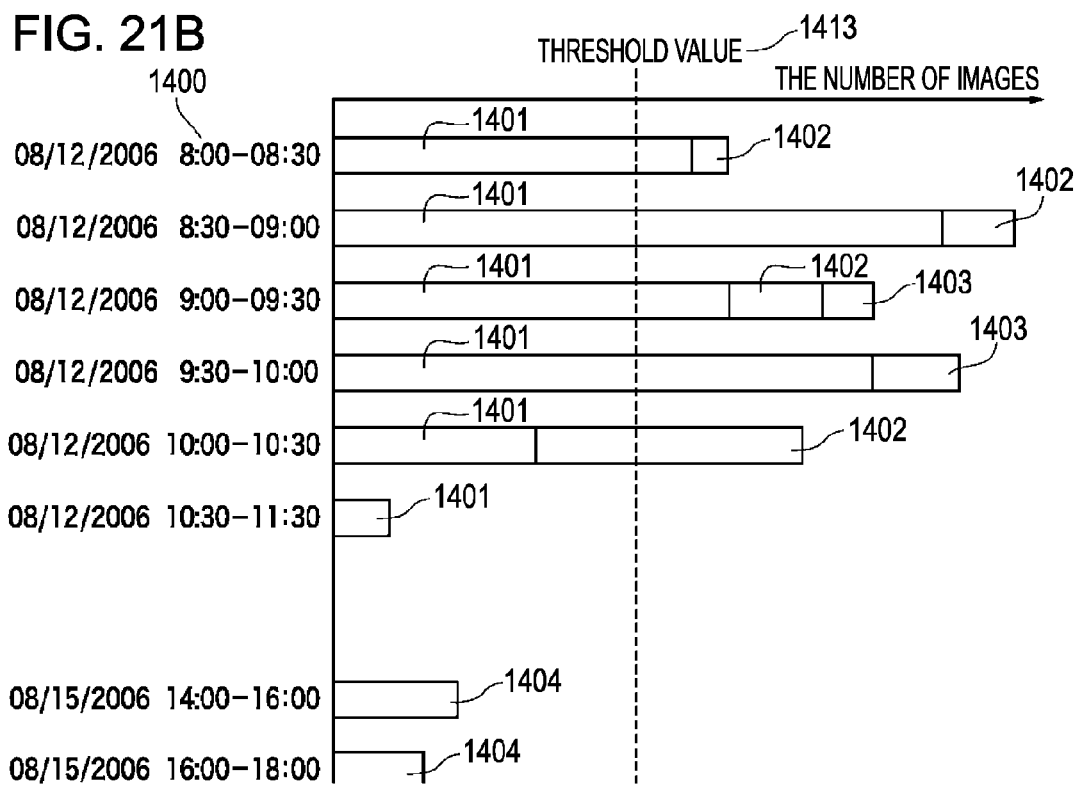

FIG. 23

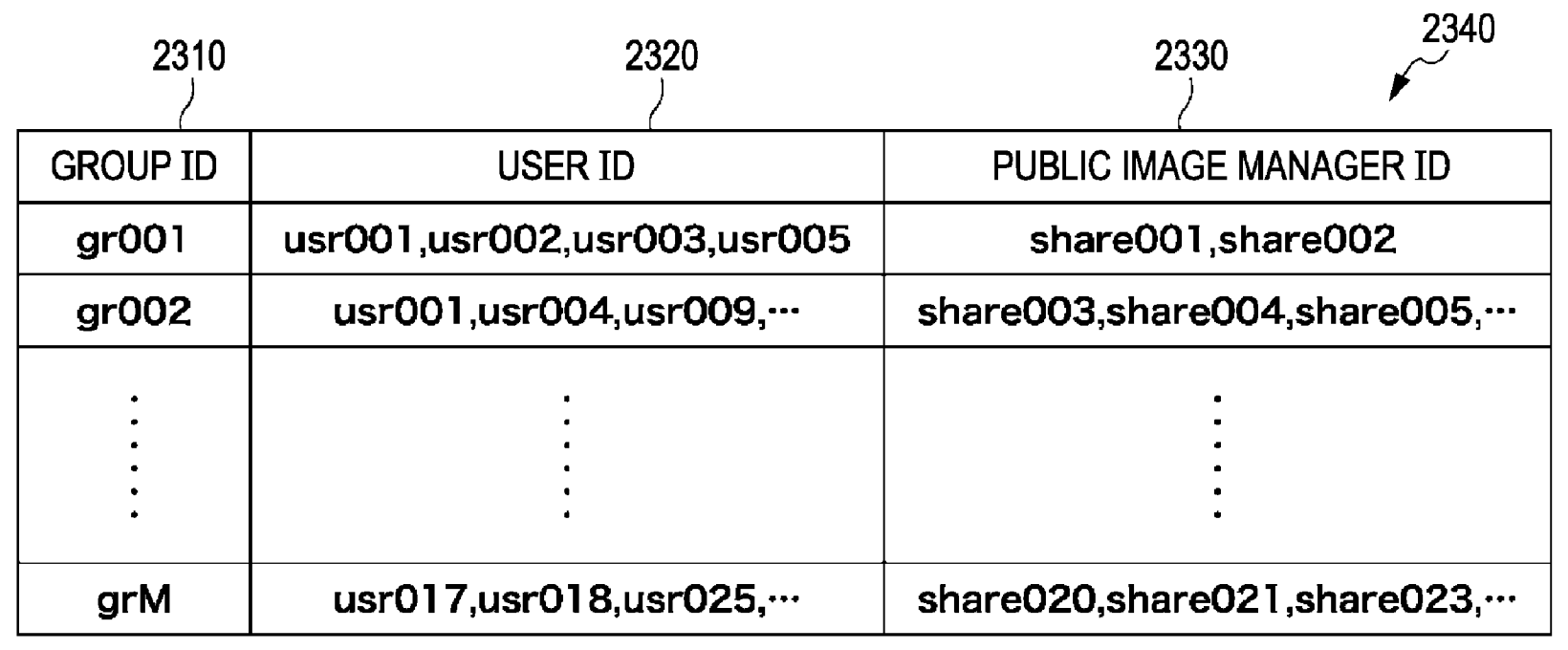

| GROUP ID | USER ID | PUBLIC IMAGE MANAGER ID |
|---|---|---|
| gr001 | usr001,usr002,usr003,usr005 | share001,share002 |
| gr002 | usr001,usr004,usr009,... | share003,share004,share005,... |
| ...... | ...... | ...... |
| grM | usr017,usr018,usr025,... | share020,share021,share023,... |

IMAGE DISPLAY CONTROLLING APPARATUS, METHOD OF CONTROLLING IMAGE DISPLAY, AND STORAGE MEDIUM

BACKGROUND OF THE INVENTION

1. Field of the Invention

The present invention relates to an image display controlling apparatus, a method of controlling image display, and a storage medium, which are capable of displaying image files shared by multiple apparatuses over a network.

2. Description of the Related Art

Electronic album systems are used to provide services in which image files of images captured by image pickup apparatuses, such as digital cameras, are registered in electronic albums on Web servers and users can view the registered image files.

Multiple members who have participated in photography events, such as school sports festivals, can use the services provided by the electronic album systems to share the same electronic album and to view the images registered in the electronic album. In such cases, the electronic albums of the images captured in the photography events are created and the Uniform Resource Locators (URLs) of the electronic albums are shared by the participants of the photography events. In addition, user identifiers (IDs) and passwords used for permitting the viewing of the electronic albums are given to specified persons in order to prevent the general public from accessing and viewing the electronic albums. In the electronic album systems, it is necessary to perform operations for temporarily storing the images captured by the digital cameras in computers, selecting images to be registered from the stored images, and registering the selected images in the electronic albums on Web servers.

Electronic album creating apparatuses are provided to capture images photographed by multiple digital cameras to which specific identification information is applied and to automatically create electronic albums of the captured images. In such cases, the specific identification information is given to each digital camera and the identification information about each digital camera is added to the images photographed by the digital camera. The digital cameras are rented to the participants of school events, for example, sports festivals. The images photographed by the digital cameras are transmitted from the digital camera to the electronic album creating apparatuses. The electronic album creating apparatuses extract images to which the same identification information is added based on the identification information about the digital cameras, added to the transmitted image data. The extracted images having the same identification information added thereto are registered in the same electronic album. The electronic album including the images photographed by the digital cameras rented to the participants is created in the above manner.

In transmission of images between electronic albums, image transmission systems are provided to automatically transmit images desired by owners of destination electronic albums to which the images are to be transmitted. Such systems, first, extract feature information concerning subjects included in the images in the destination electronic albums. Next, the systems select images including subjects having levels of similarity higher than a reference value with the subjects included in the images stored in the destination electronic albums from the images in the destination electronic albums based on the extracted feature information. Then, the systems automatically transmit the selected images to the destination electronic albums.

In the electronic album systems described above, for example, if private albums are created in advance and the created private albums are registered in public albums on Web servers, it is possible for members participating in the systems to view the private albums registered in the public albums.

However, the members can also view images that are included in the private albums registered in the public albums and that are not concerned with the members.

For example, it is presumed that Mr. A, who is a parent of children in the 3rd grade and the 5th grade of an elementary school, uses one digital camera to photograph the children of the 3rd grade and the 5th grade participating in the sports festival in the elementary school and creates a private album including the captured images. It is also presumed that, in order to allow the private album to be shared, the private album is registered in a public album titled "Ms. Adam's class—the 3rd grade" and in a public album titled "Mr. James's class—the 5th grade" created in a Web server.

In the above case, images of the children in the 5th grade, which are not concerned with the members of the public album titled "Ms. Adam's class—the 3rd grade", are registered in the public album "Ms. Adam's class—the 3rd grade". Similarly, images of the children in the 3rd grade, which are not concerned with the members of the public album titled "Mr. James's class—5th grade", are registered in the public album titled "Mr. James's class—5th grade".

It is not desirable to register the images that are not concerned with the members viewing the public album. Accordingly, a method can be proposed in which Mr. A creates private albums for the 3rd grade and the 5th grade and registers the private albums in the corresponding public albums. However, it is necessary to troublesomely perform an operation for sorting the multiple captured images by the private albums.

SUMMARY OF THE INVENTION

The present invention provides an image display controlling apparatus, a method of controlling image display, and a storage medium, which are capable of distinctively displaying image files having higher levels of sharing and images files having lower levels of sharing, among private image files registered in association with a public folder.

According to an embodiment of the present invention, an image display controlling apparatus includes a registering unit configured to register an image file in association with a public folder; an attribute information extracting unit configured to extract attribute information from the image file; a feature information determining unit configured to determine feature information based on the attribute information about multiple image files registered in association with the public folder; and a setting unit configured to set a display mode of the image file based on the relation between the attribute information about each image file and the feature information.

According to another embodiment of the present invention, a method of controlling image display includes the steps of registering an image file in association with a public folder; extracting attribute information from the image file; determining feature information based on the attribute information about multiple image files registered in association with the public folder; and setting a display mode of the image file based on the relation between the attribute information about each image file and the feature information.

According to another embodiment of the present invention, a computer-readable storage medium includes computer-executable instructions for registering an image file in association with a public folder; computer-executable instructions for extracting attribute information from the image file; computer-executable instructions for determining feature information based on the attribute information about multiple image files registered in association with the public folder; and computer-executable instructions for setting a display mode of the image file based on the relation between the attribute information about each image file and the feature information.

Further features and aspects of the present invention will become apparent from the following description of exemplary embodiments with reference to the attached drawings.

BRIEF DESCRIPTION OF THE DRAWINGS

FIG. 3 shows another example of the user interface screen according to the first embodiment of the present invention.

FIG. 4 shows another example of the user interface screen according to the first embodiment of the present invention.

FIGS. 12A and 12B show examples of tables used for managing information according to the first embodiment of the present invention.

FIGS. 16A and 16B show examples of tables used for managing information according to the second embodiment of the present invention.

FIGS. 21A and 21B show examples of tables used for managing information according to the third embodiment of the present invention.

FIG. 23 shows an example of a table used for managing information according to the fourth embodiment of the present invention.

DESCRIPTION OF THE EMBODIMENTS

First Embodiment

Exemplary embodiments of the present invention will herein be described with reference to the attached drawings.

First Exemplary Embodiment

Figure 1:
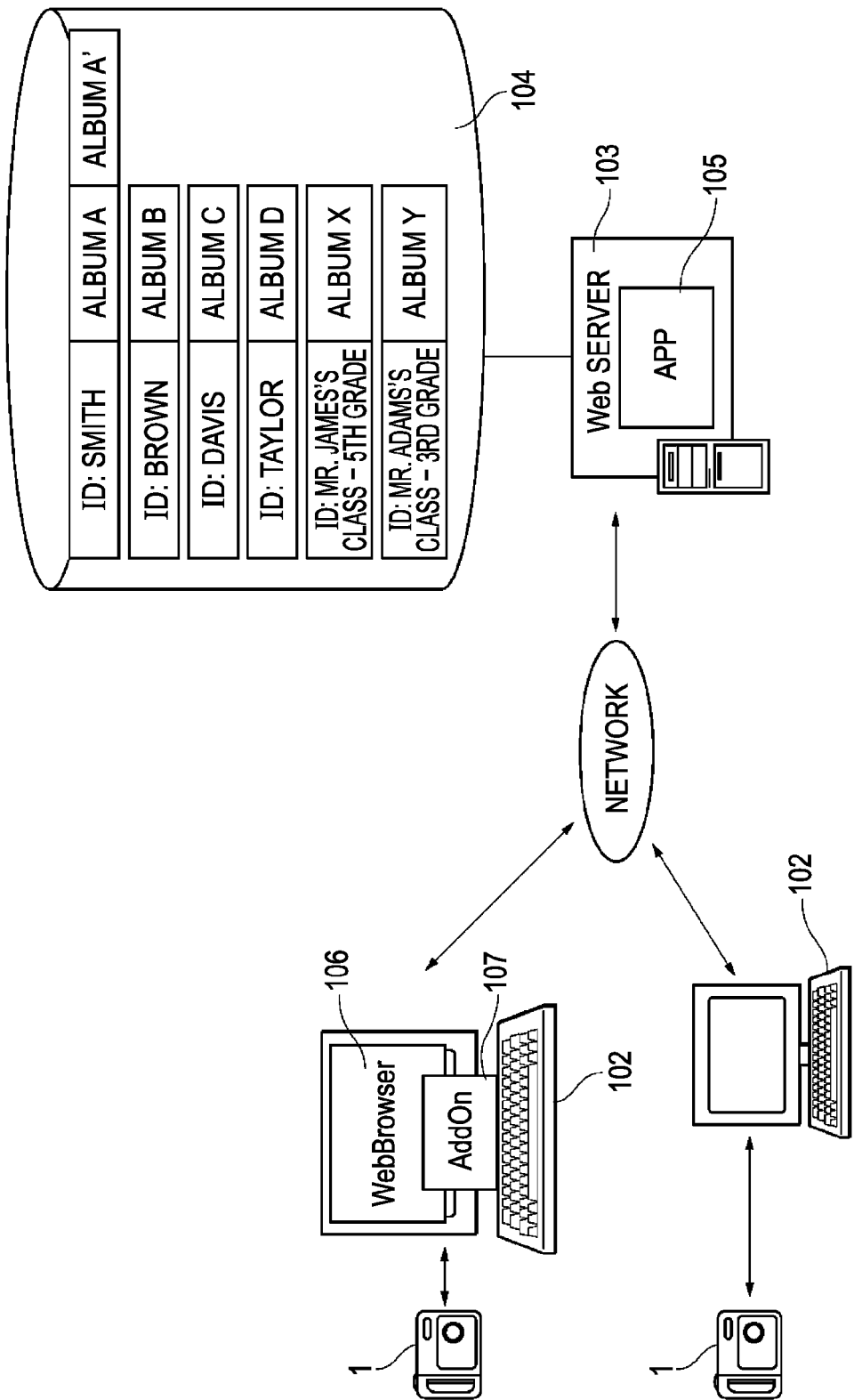
FIG. 1 is a block diagram showing an example of the configuration of a system including an image display controlling apparatus according to a first embodiment of the present invention.

FIG. 1 is a block diagram showing an example of the configuration of a system including an image display controlling apparatus according to a first embodiment of the present invention.

As shown in FIG. 1, the system includes a Web server 103 realizing the image display controlling apparatus according to the first embodiment of the present invention and multiple client personal computers (PCs) 102 connected to the Web server 103 over a network, such as the Internet.

A database (hereinafter referred to as DB) 104 is connected to the Web server 103. Data that includes image data, information concerning albums, and so on and that is necessary to provide an electronic album service is stored in the DB 104. For example, in the example shown in FIG. 1, the DB 104 includes five private albums "Album A", Album A'", "Album B", "Album C", and "Album D" and two public albums "Album X" and "Album Y". It is presumed that no restriction is imposed on the number of albums stored in the DB 104, the number of pieces of the image data that can be registered in each album, and the size of the image data that can be registered in each album. The public albums are folders (public folders) in which image files and the private albums are registered in association with the public folders. The private albums are folders (private folders) in which the image files are registered in association with the private folders.

The Web server 103 includes an application program package (APP) 105 used for executing application software. The APP 105 is composed of a central processing unit (CPU). The APP 105 reads out operating system (OS) programs stored in a read only memory (ROM) or a hard disk in the Web server 103 to build the OS. The APP 105 reads out the application software stored in the ROM or the hard disk on the OS and executes a random access memory (RAM) as a working area. The execution of the application software allows a variety of processing relating to the electronic album service described below to be performed. If necessary, the APP 105 accesses the DB 104 in response to an instruction issued from the application software or the OS to register, update, or delete the records in the DB 104.

Each client PC 102 is used by a user to upload the image data in the DB 104 through the Web server 103. The client PC 102 includes an OS, such as Windows®, and a Web browser 106, such as Internet Explorer®. The client PC 102 also includes an AddOn 107 used for simplifying the upload of the image data in response to an instruction from the Web browser 106. The AddOn 107 is composed of the CPU of the client PC 102.

Each client PC 102 is provided with an interface, such as a universal serial bus (USB), used for connection to a digital camera 1. Images captured by the digital camera 1 are loaded in the client PC 102 through this interface.

How the APP 105 realizes an electronic album system will now be specifically described.

When the APP 105 receives an entity body transmitted according to a Hyper Text Transfer Protocol (HTTP) from the client PC 102, the APP 105 performs required processing, such as an access to the DB 104, based on the received entity body. The APP 105, then, returns an appropriate Hyper Text Markup Language (HTML) source to the client PC 102.

The entity body according to the HTTP generally has a structure in which "variables" or "values" are connected to each other by using "&". The value of the entity body is encoded in the URL. A detailed description of the structure and encoding is not provided herein.

The APP 105 has various functions of, for example, deleting the image data from the DB 104 and managing albums stored in the DB 104 in order to realize the electronic album system. According to the first embodiment of the present invention, the functions are specified based on the value of a variable FUNC included in the entity body transmitted from the client PC 102.

An entity body used to register an image file in a private album will now be described. This entity body includes four variables FUNC, ALBUM, NAME, and BODY.

The variable FUNC is used to specify the type of the processing for the APP 105, as described above. The value of the variable FUNC is set to "regist" meaning registration of an image file in a private album.

The variable ALBUM indicates the name of a private album in which the image file specified with the variable NAME and the variable BODY is registered in association with the private album. If the private album having the name specified with the function ALBUM exists in the DB 104, the APP 105 associates the image file with the private album without creating a new private album and additionally registers the image file associated with the private album. If any image file having the same name as the image file to be newly registered has already been registered in the private album in association with the private album, the APP 105 may overwrite the existing image file with the image file to be newly registered. If no private album having the name specified with the variable ALBUM exists in the DB 104, the APP 105 creates a new private album in the DB 104 and registers the created private album in association with the image file.

The variable NAME represents the character string indicating the name of the image file to be associated with and stored in the private album specified with the variable ALBUM. The variable BODY indicates the data body of the image file to be registered in the DB 104 and is transmitted from the client PC 102.

An entity body used to register a public album in the DB 104 will now be described. This entity body includes three variables FUNC, ALBUM, and OWNERID.

The value of the variable FUNC is set to "create comm" meaning creation of a public album. The variable ALBUM represents the character string indicating the name of the public album. The variable OWNERID indicates the ID of an owner accessible to the public album. The ID of one owner or the IDs of multiple owners are described in the variable OWNERID.

If any public album having the same name as the public album specified with the variable ALBUM exists in the DB 104, the APP 105 does not create a new public album having the name specified with the variable ALBUM. If no folder that is associated with the public album specified with the variable ALBUM and that has the owner ID specified with the variable OWNERID exists in the DB 104, the APP 105 creates a new folder having the owner ID and additionally registers the folder in association with the public album. If any folder having the owner ID specified with the variable OWNERID exists in the DB 104, the APP 105 does not create a new folder having the owner ID.

If no public album specified with the variable ALBUM exists in the DB 104, the APP 105 creates a new public album having the name specified with the variable ALBUM in the DB 104. Then, the APP 105 creates a folder having the owner ID specified with the variable OWNERID and registers the created folder in the DB 104 in association with the public album newly created.

An entity body used to register a private album in a public album will now be described. This entity body includes four variables FUNC, ALBUM, OWNERID, and PRIVATEALBUM.

The value of the variable FUNC is set to "regist album" meaning registration of the private album in the public album. The variable ALBUM is used to specify the name of a public album in which the private album is registered in association with the public album. The variable OWNERID indicates the ID of the owner of the private album. The variable PRIVATEALBUM is used to specify the private album registered in the DB 104 in association with the public album specified with the variable ALBUM.

If any public album having the name specified with the variable ALBUM exists in the DB 104, the APP 105 determines whether the folder having the owner ID specified with the variable OWNERID is registered in the public album in association with the public album. If the folder having the owner ID specified with the variable OWNERID is registered, the APP 105 determines whether the private album specified with the variable PRIVATEALBUM is registered in the folder having the owner ID in association with the folder. If no private album specified with the variable PRIVATEALBUM is registered, the APP 105 registers the private album specified with the variable PRIVATEALBUM in association with the folder having the owner ID. The private album newly created is linked to the image files in the original private album. The link will be described in detail below with reference to FIG. 5. If any private album specified with the variable PRIVATEALBUM is registered in association with the folder having the owner ID, the APP 105 does not register a new private album.

If no folder having the owner ID specified with the variable OWNERID is registered in association with the public album having the name specified with the variable ALBUM, the APP 105 creates a folder having the owner ID specified with the variable OWNERID. The APP 105, then, associates the folder having the owner ID with the public album having the name specified with the variable ALBUM and registers the folder associated with the public album. Furthermore, the APP 105 creates a private album specified with the variable PRIVATEALBUM and links the created private album to the image files registered in the original private album. The link will be described in detail below with reference to FIG. 5.

Figure 2:
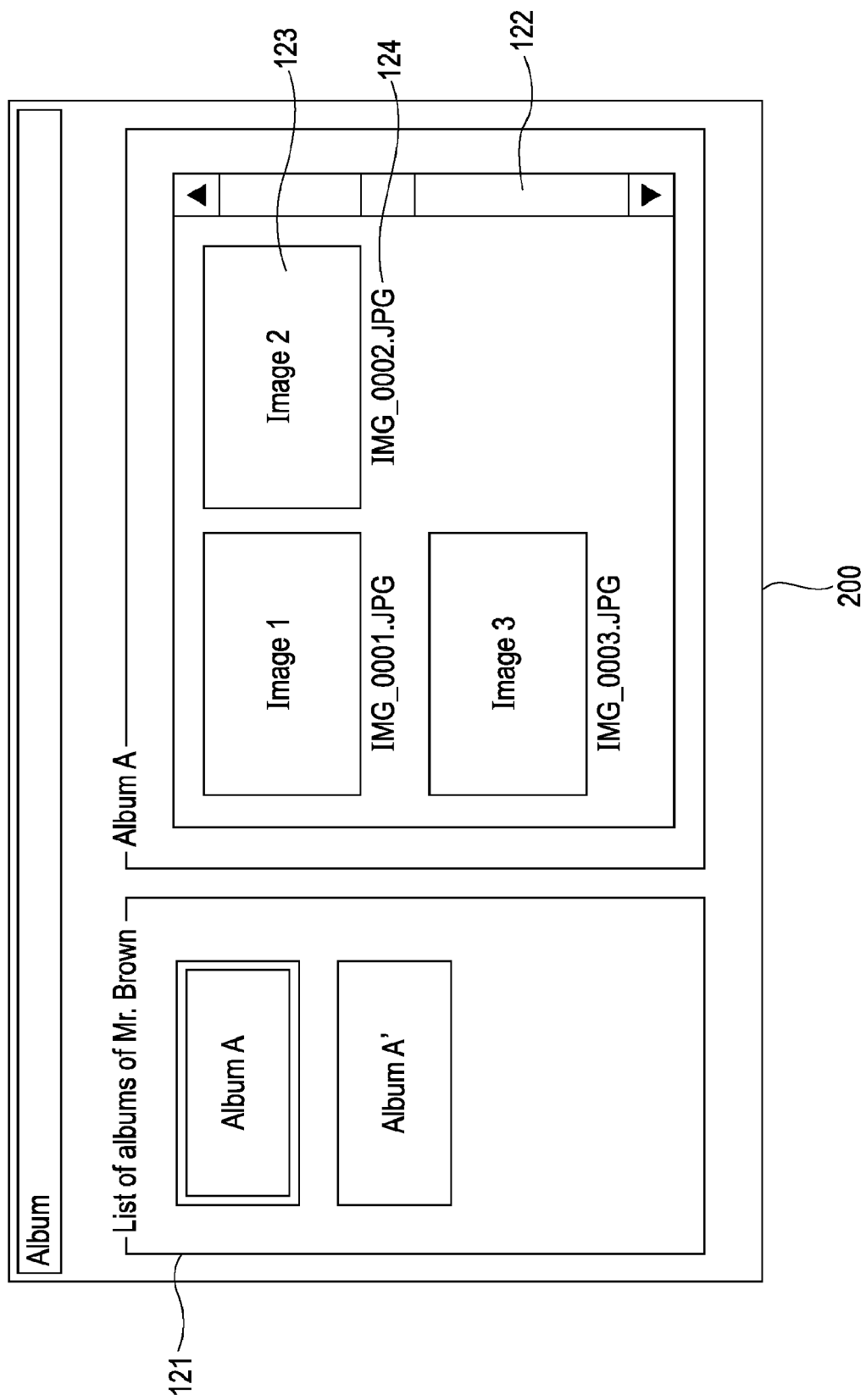
FIG. 2 shows an example of a user interface screen according to the first embodiment of the present invention.

A user interface used when a user uses the Web browser 106 of the client PC 102 to view a private album stored in the DB 104 will now be described with reference to FIG. 2. FIG. 2 shows an example of a user interface screen 200 displayed in the Web browser 106 of the client PC 102 when the user views the private album stored in the DB 104.

When Mr. Brown uses the Web browser 106 of the client PC 102 to view private albums that are stored in the DB 104 and that are owned by Mr. Brown, the client PC 102 accesses the Web server 103 to request viewing of the private albums. The Web server 103 reads out a list of the private albums owned by Mr. Brown from the DB 104 in response to the access from the client PC 102, creates an HTML file based on the readout list, and transmits the created HTML file to the client PC 102. The client PC 102 receives the HTML file of the list of the private albums owned by the Mr. Brown, transmitted from the Web server 103. The Web browser 106 displays the user interface screen 200 including a list 121 of the private albums, as shown in FIG. 2. In the example in FIG. 2, the list of the names of two private albums "Album A" and "Album A'" owned by Mr. Brown is displayed.

If the "Album A" is selected from the list of the names of the private albums, a list 122 of images stored in the "Album A" is displayed. In the example shown in FIG. 2, three images 123 "Image 1", "Image 2", and "Image 3" stored in the "Album A" and their names 124 are displayed.

A user interface used when a user creates a public album in the DB 104 will now be described with reference to FIG. 3. FIG. 3 shows an example of a user interface screen 300 displayed in the Web browser 106 of the client PC 102 when the user instructs creation of a public album in the DB 104.

In order to create a public album in the DB 104, the client PC 102 accesses the Web server 103 to request the Web server 103 to create a public album. The Web server 103 transmits an HTML file to the client PC 102 in response to the access from the client PC 102. The Web browser 106 displays, for example, the user interface screen 300 shown in FIG. 3 based on the HTML file transmitted from the Web server 103. An input box 131 used to input the name of a public album and input boxes 132 used to input the IDs of owners between which the public album is shared are displayed in the user interface screen 300. In the example in FIG. 3, "Sports Festival 2006 Mr. James's class—5th grade" is input in the input box 131 as the name of the public album. The IDs of three owners, such as "Smith.nnnn@mmmm.com", are input in the input boxes 132 as the IDs of the owners between which the public album is shared. Since each owner ID must be a unique character string, for example, an e-mail address is used as the owner ID. The owner ID is not limited to an e-mail address and may be any character string as long as the owner ID can be used to uniquely identify the owner.

Each piece of the information input on the user interface screen 300 is transmitted from the client PC 102 to the Web server 103. The Web server 103 receives the information transmitted from the client PC 102 and creates a public album based on the received information. The created public album is stored in the DB 104.

A user interface used to register a private album in a public album stored in the DB 104 will now be described with reference to FIG. 4. FIG. 4 shows an example of a user interface screen 400 displayed in the Web browser 106 of the client PC 102 when a user registers a private album in a public album stored in the DB 104. In the example shown in FIG. 4, a private album owned by Mr. Brown is to be registered in a public album in the DB 104.

In order to register the private album owned by Mr. Brown in the public album in the DB 104, the client PC 102 accesses the Web server 103 to request registration of the private album in the public album "Sports Festival 2006 Mr. James's class—5th grade". The Web server 103 reads out a list of the private albums owned by Mr. Brown from the DB 104 in response to the access from the client PC 102, creates an HTML file based on the readout list, and transmits the created HTML file to the client PC 102. The client PC 102 receives the HTML file including the list of the private albums owned by Mr. Brown, transmitted from the Web server 103. The Web browser 106 displays the user interface screen 400 shown in FIG. 4. The user interface screen 400 includes a screen 133 including the name of a public album, "Sports Festival 2006 Mr. James's class—5th grade", shared between Mr. Brown and the other owners of the public album and a list of the names of private albums owned by Mr. Brown. The public album "Sports Festival 2006 Mr. James's class—5th grade" is shared between Mr. Brown, Mr. Smith, and Mr. Davis (refer to FIG. 3).

It is presumed that "Album A" is selected from the list of the private albums on the screen 133 as an album to be registered in the public album. When a Public button 137 is pressed, the image files associated with and registered in the selected private album "Album A" are registered in the public album "Sports Festival 2006 Mr. James's class—5th grade" and a list 136 of the registered image files is displayed. Three images "Image 1", "Image 2", and "Image 3" are associated with and registered in "Album A". The images 123 including "Image 1", "Image 2", and "Image 3" and their names 124 are displayed as the list 136 of the image files newly registered in the public album "Sports Festival 2006 Mr. James's class—5th grade" in association therewith.

Figure 5:
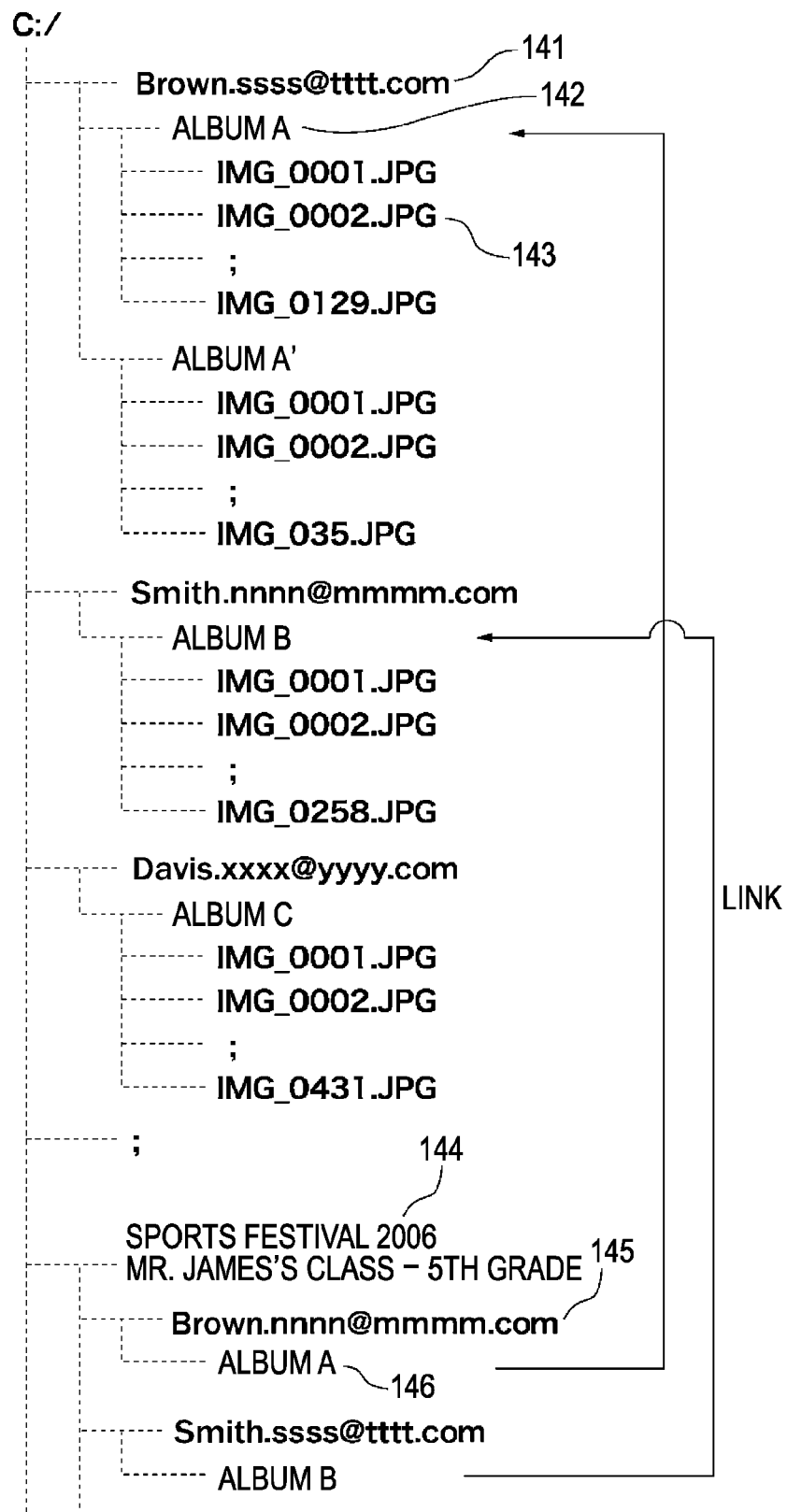
FIG. 5 shows an example of the structure of an image file stored in a database according to the first embodiment of the present invention.

FIG. 5 shows an example of the structure of an image file stored in the DB 104.

In the example shown in FIG. 5, the owner having an owner ID "Brown.ssss@tttt.com" owns private albums "Album A" and "Album A'". The owner having an owner ID "Smith.nnnn@mmmm.com" owns a private album "Album B". The owner having an owner ID "Davis.xxxx@yyyy.com" owns a private album "Album C". A public album shared between the above owners is named "Sports Festival 2006 Mr. James's class—5th grade".

In this example, multiple owner ID folders 141 having the same names as the owner IDs and a public album folder 144 corresponding to the public album "Sports Festival 2006 Mr. James's class—5th grade" are stored in the DB 104. Each owner ID folder 141 includes at least one album folder 142 as a private album.

Owner ID folders 145 having the same names as the owner IDs sharing the public album are associated with and stored in the public album folder 144. A shared private album 146 is associated with and stored in each owner ID folder 145. The private album 146 is linked to image data 143 in the album folder 142 in the owner ID folder 141. The private album 146 has the same owner ID as the album folder 142.

Figure 6:
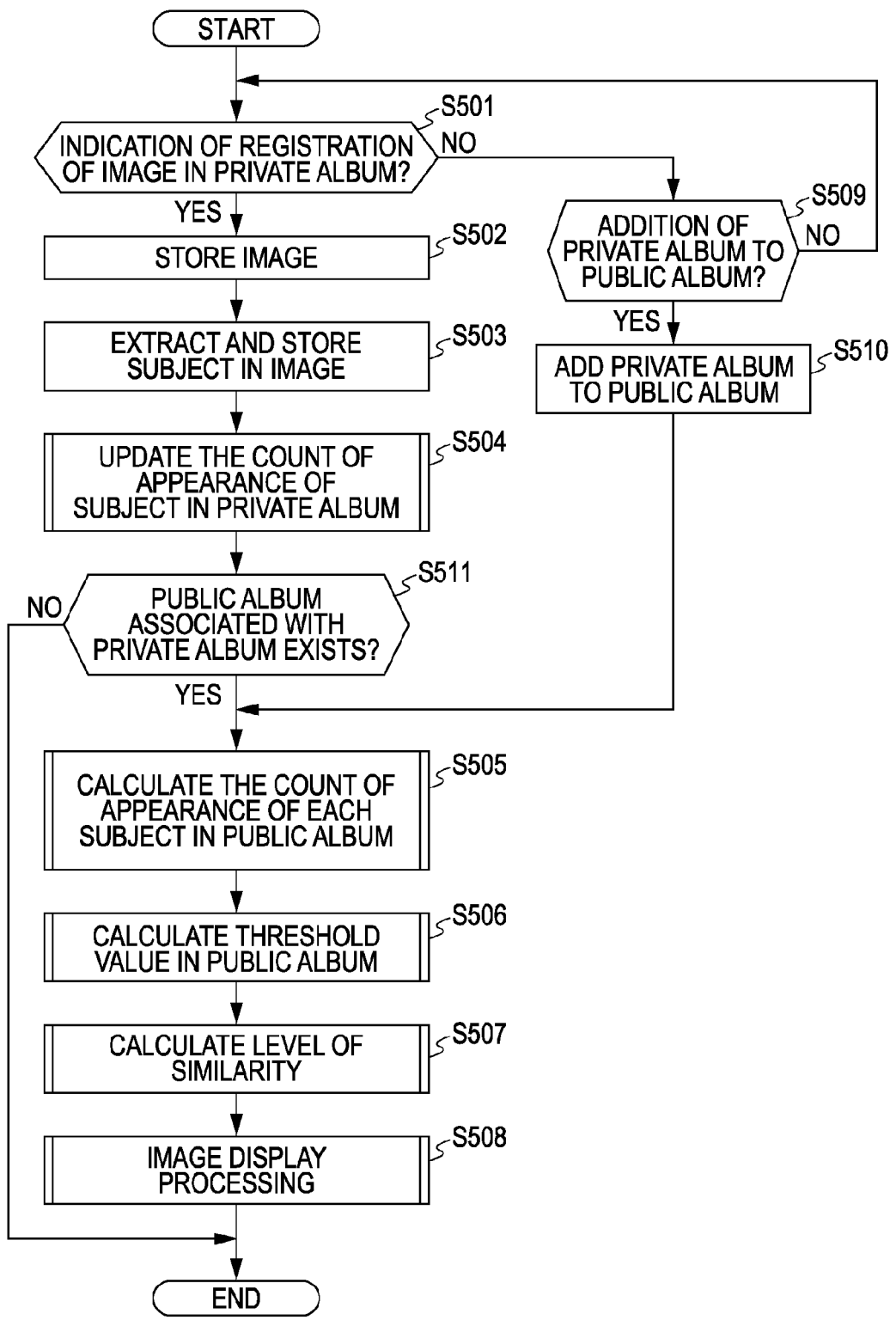
FIG. 6 is a flowchart showing an example of an operational process performed by an APP in a Web server according to the first embodiment of the present invention.

FIG. 6 is a flowchart showing an example of an operational process performed by the APP 105 in the Web server 103.

After receiving an entity body according to the HTTP from the client PC 102, then in Step S501, the APP 105 identifies a function based on the value of the variable FUNC. If the APP 105 identifies a function of registering an image file in a private album (YES in Step S501), the APP 105 goes to Step S502. Otherwise (NO in Step S501), the APP 105 goes to Step S509.

In Step S502, the APP 105 registers the image file in the private album and stores the image file in the DB 104.

In Step S503, the APP 105 extracts a subject appearing in the image in the image file stored in Step S502, as subject feature information concerning the subject, and stores the subject feature information in the DB 104 in association with the image file. For example, if the subject is a person, the APP 105 extracts the subject feature information concerning the face of the subject by face recognition processing and stores the extracted subject feature information in the DB 104 in association with the image file as the subject feature information used for identifying the subject. The APP 105 extracts a subject having the same subject feature information from other image files associated with the private album based on the subject feature information concerning the subject appearing in the image file. In Step S504, the APP 105 acquires the count of appearance of the extracted subject to update the count of appearance of the subject in the private album. The update of the count of appearance will be described in detail below.

In Step S511, the APP 105 determines whether any public album associated with the private album exists. If the APP 105 determines that no public album associated with the private album exists (NO in Step S511), the APP 105 terminates the operational process in FIG. 6.

If the APP 105 determines in Step S511 that any public album associated with the private album exists (YES in Step S511), then in Step S505, the APP 105 acquires the count of appearance of each subject in all the image files associated with the public album. Specifically, the APP 105 extracts the same subject from the image files based on the subject feature information concerning the subject associated with the image file to acquire the count of appearance of the extracted subject. The acquisition of the count of appearance will be described in detail below.

In Step S506, the APP 105 uses the acquired count of appearance of the subject to calculate the threshold value (reference value) indicating the reference count of appearance in the public album. The calculation of the threshold value will be described in detail below. In Step S507, the APP 105 compares the calculated threshold value with the count of appearance of each subject in the public album to acquire the levels of similarity of all the image files based on the comparison result. The acquisition of the levels of similarity will be described in detail below. In Step S508, the APP 105 performs image display processing to set the display mode of each image file in the public album based on the acquired level of similarity. The image display processing will be described in detail below.

If in Step S501, the APP 105 does not identify a function of registering an image file in a private album (NO in Step S501), then in Step S509, the APP 105 determines whether the private album is to be registered in the public album. If the APP 105 determines that the private album is to be registered in the public album (YES in Step S509), then in Step S510, the APP 105 registers the private album in the public album. The APP 105 then performs Steps S505 to S508. If the APP 105 determines in Step S509 that the private album is not to be registered in the public album (NO in Step S509), the APP 105 goes back to Step S501. The image files associated with the private album associated with and registered in the public album are subjected to the extraction of the subjects and the update of the counts of appearance of the subjects in the private album.

Figure 7:
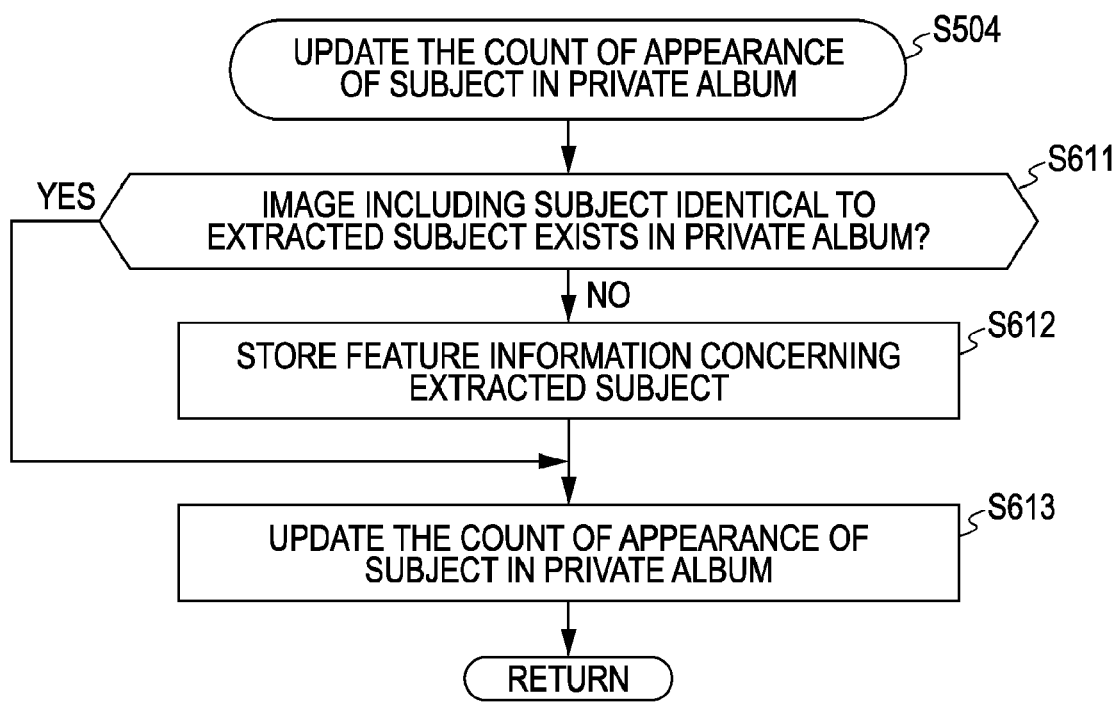
FIG. 7 is a flowchart showing in detail the operational process performed by the APP in the Web server according to the first embodiment of the present invention.

FIG. 7 is a flowchart showing in detail the update of the count of appearance of each subject in the private album in Step S504.

In Step S611, the APP 105 determines whether the image file including the subject identical to the subject extracted from the image file to be associated with and registered in the private album has been associated with and registered in the private album. If the APP 105 determines that such an image file has not been associated with and registered in the private album (NO in Step S611), then in Step S612, the APP 105 stores the subject feature information concerning the subject extracted from the image file to be registered in the DB 104 in association with the image file. Since the image file including the subject identical to the subject extracted from the image file to be registered has not been registered in the private album, then in Step S613, the APP 105 sets the count of appearance of the subject to one. Then, the APP 105 terminates the update process in FIG. 7.

If the APP 105 determines in Step S611 that the image file including the subject identical to the subject extracted from the image file to be registered has been associated with and registered in the private album (YES in Step S611), the APP 105 skips Step S612 and goes to Step S613. In Step S613, the APP 105 increments the count of appearance of the subject to update the count of appearance. Then, the APP 105 terminates the update process in FIG. 7.

Figure 8:
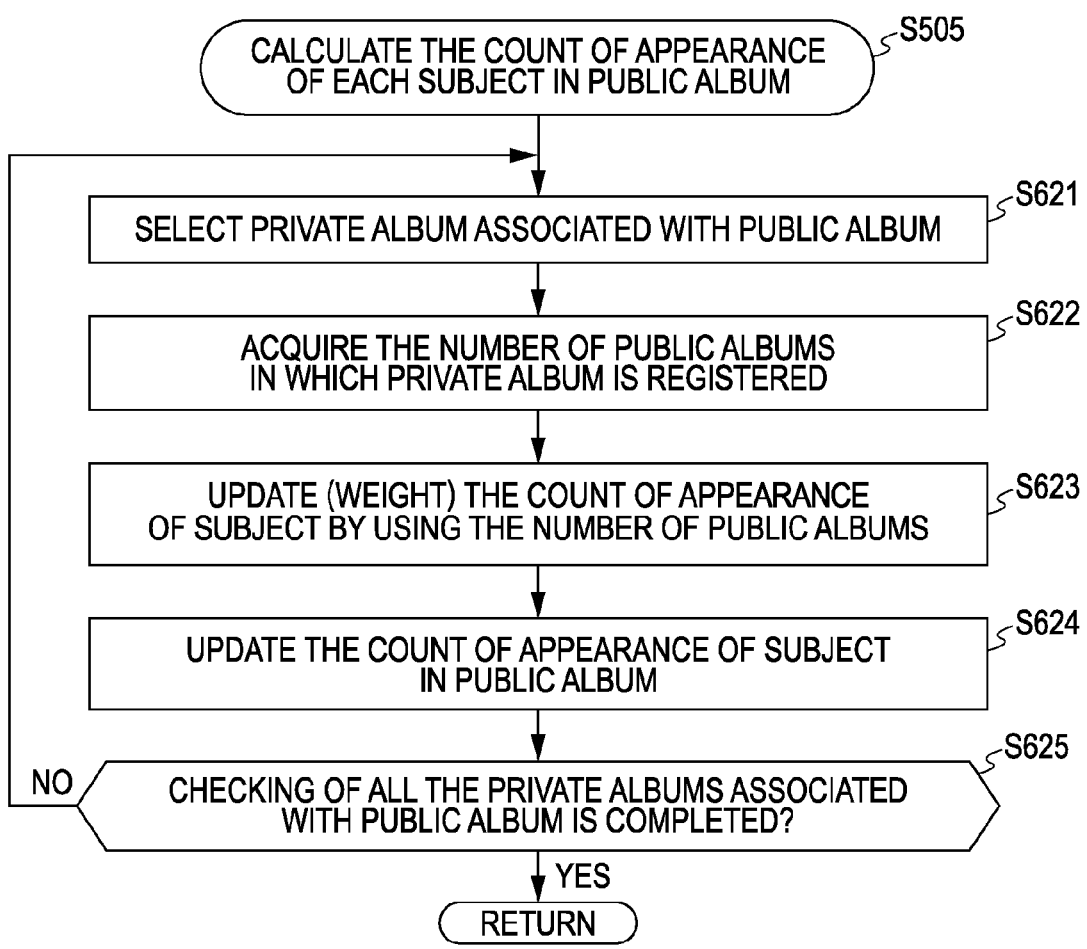
FIG. 8 is a flowchart showing in detail the operational process performed by the APP in the Web server according to the first embodiment of the present invention.

FIG. 8 is a flowchart showing in detail the acquisition of the count of appearance of each subject in all the image files associated with the public album in Step S505.

In Step S621, the APP 105 selects one private album associated with the public album. In Step S622, the APP 105 acquires the number of public albums associated with the selected private album (the number of public albums in which the private album is registered). In Step S623, the APP 105 uses the acquired number of public albums in which the private album is registered to update (weight) the count of appearance of each subject in the selected private album. For example, the count of appearance of the subject is weighted by dividing the acquired count of appearance of the subject by the number of public albums. In other words, the count of appearance of the subject is updated to the value given by dividing the acquired count of appearance of the subject by the number of public albums.

In Step S624, the APP 105 adds the count of appearance of each subject in the public album to the updated count of appearance of the subject to update the count of appearance of the subject. In Step S625, the APP 105 determines whether the checking of all the private albums associated with the public album is completed. If the APP 105 determines that the checking of all the private albums associated with the public album is completed (YES in Step S625), the APP 105 terminates the acquisition process in FIG. 8. If the APP 105 determines that the checking of all the private albums associated with the public album is not completed (NO in Step S625), the APP 105 goes back to Step S621 to repeat the above steps. According to the first embodiment of the present invention, the larger the number of public albums associated with the private album, the smaller the weighted value for the count of appearance of the subject. This is because a larger number of the public albums associated with the private album means that a larger number of subjects associated with other public albums are included in the private album and it is determined that the amount of noise is increased. Accordingly, it is possible to display the image file in which a subject specific to the public album appears in a larger size.

Figure 9:
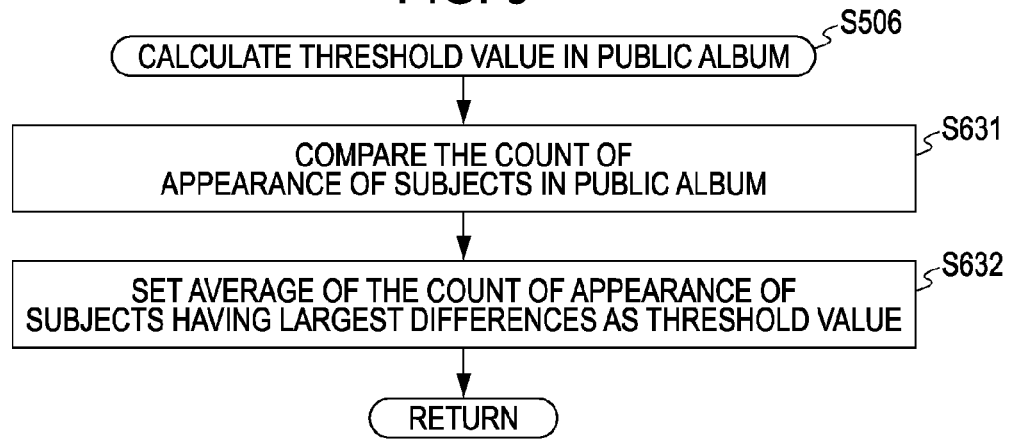
FIG. 9 is a flowchart showing in detail the operational process performed by the APP in the Web server according to the first embodiment of the present invention.

FIG. 9 is a flowchart showing in detail the calculation of the threshold value of the public album in Step S506.

In Step S631, the APP 105 compares the count of appearance before the weighting with the weighted count of appearance for every subject appearing in the public album. In Step S632, the APP 105 selects two subjects having the two largest differences between the count of appearance before the weighting and the weighted count of appearance based on the comparison result to set the average of the counts of appearance of the selected two subjects as the threshold value. Then, the APP 105 terminates the calculation process in FIG. 9.

The count of appearance acquired for every subject in Step S505 will now be described with reference to tables shown in FIGS. 12A and 12B. FIG. 12A is a table showing examples of the counts of appearance acquired for every subject in Step S505 in FIG. 6. FIG. 12B is a table showing examples of the counts of appearance of the subjects appearing in the public album, acquired based on the counts of appearance acquired for every subject shown in FIG. 12A.

In the example shown in FIG. 12A, a private album column 701 includes three private albums "Album A", "Album B", and "Album C" that are associated with a public album "Sports Festival 2006 Mr. James's class—5th grade" in a public album column 700. Since "Album A" and "Album B" are associated only with the public album "Sports Festival 2006 Mr. James's class—5th grade", both the number of public albums in which "Album A" is registered and the number of public albums in which "Album B" is registered, shown in the number of public albums column 702, are "one". Since "Album C" is also associated with another public album other than the public album "Sports Festival 2006 Mr. James's class—5th grade", the number of public albums in which "Album C" is registered, as shown in the number of public albums column 702, is "two".

For example, it is presumed that five subjects "a", "b", "c1", "c2", and "d" appear in 200 images stored in "Album C", as shown in a subject column 704. The five subjects have the counts of appearance "40", "50", "80", "80", and "40", respectively, as shown in the count of appearance column 705. Dividing the count of appearance of each subject by the number of public albums in which the private album is registered provides the weighted count of appearance of each subject, as shown in the count of appearance (weighted) column 706. The subjects for "Album C" have the weighted counts of appearance "20", "25", "40", "40", and "20", respectively.

As shown in FIG. 12B, the sum of the weighted counts of appearance of each subject in the private albums indicates the final count of appearance of each subject in the public album, as shown in the final count of appearance column 707. The subjects "a", "b", "c1", "c2", and "d" have the final counts of appearance "120", "135", "130", "40", and "20", respectively.

Two subjects having the two largest differences between the count of appearance before the weighting and the weighted count of appearance are selected, with reference to the values in the final count of appearance column 707. In the example shown in FIGS. 12A and 12B, the subject "c1" having the count of appearance 708 and the subject "c2" having the count of appearance 709 are extracted to calculate the average of the count of appearance 708 of the subject "c1" and the count of appearance 709 of the subject "c2". The calculated average is set to the threshold value of the public album. Specifically, (130+40)/2=85 is set to the threshold value of the public album. As a result, the subjects "a", "b", and "c1" have the counts of appearance larger than the threshold value, and the subjects "c2" and "d" have the counts of appearance smaller than the threshold value.

Figure 10:
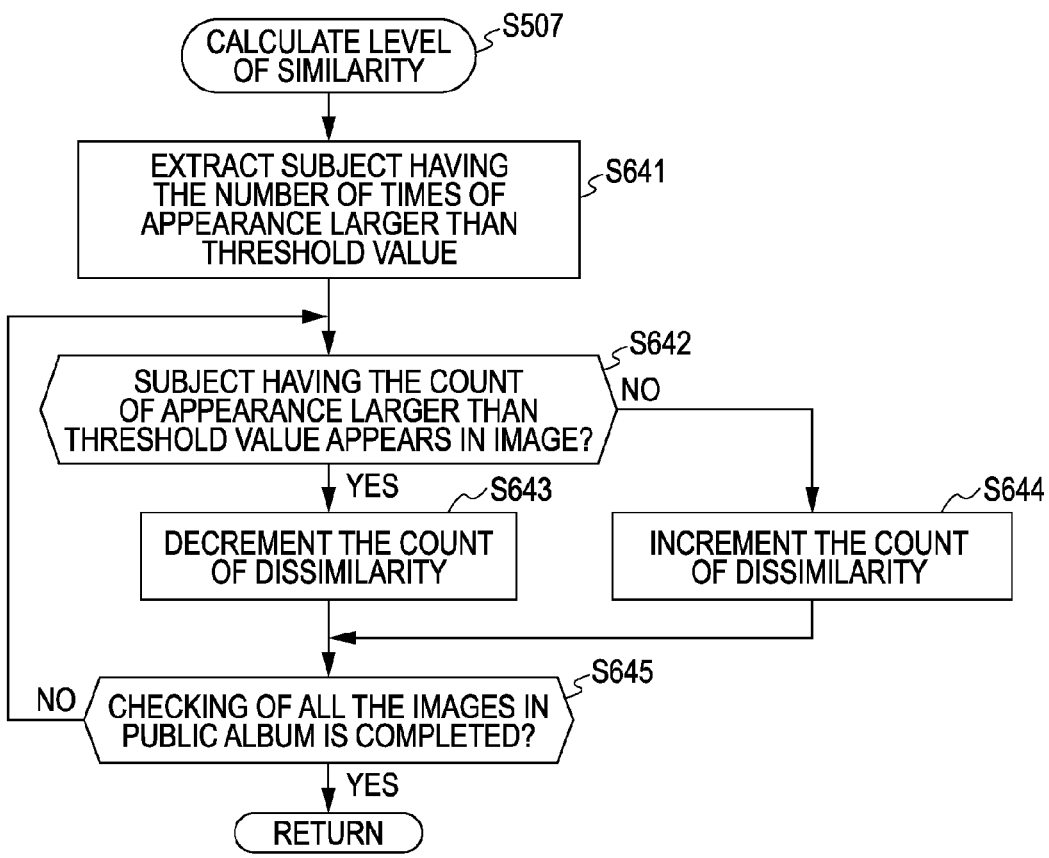
FIG. 10 is a flowchart showing in detail the operational process performed by the APP in the Web server according to the first embodiment of the present invention.

FIG. 10 is a flowchart showing in detail the acquisition of the level of similarity in Step S507 in FIG. 6.

In Step S641, the APP 105 extracts a subject having the count of appearance larger than the calculated threshold value in the public album. In this embodiment, the feature information is determined as the subject feature information of this subject. In Step S642, the APP 105 selects one image file from the public album to determine whether the subject (having the count of appearance larger than the calculated threshold value) extracted in Step S641 appears in the selected image file. If the APP 105 determines that the extracted subject (having the count of appearance larger than the calculated threshold value) appears in the selected image file (YES in Step S642), then in Step S643, the APP 105 decrements the count of dissimilarity of the selected image file. The count of dissimilarity is set to "zero" if the decrement provides a value smaller than "zero". The count of dissimilarity is used as the value indicating the level of similarity with the threshold value, that is, indicating whether the image file registered in the public album has a higher level of sharing. The level of similarity with the threshold value is increased with the decreasing count of dissimilarity.

In Step S645, the APP 105 determines whether the checking of all the image files associated with the public album is completed. If the APP 105 determines that the checking of all the image files associated with the public album is not completed (NO in Step S645), the APP 105 goes back to Step S642 to check the next image file. If the APP 105 determines that the checking of all the image files associated with the public album is completed (YES in Step S645), the APP 105 terminates the acquisition process in FIG. 10.

If the APP 105 determines in Step S642 that the extracted subject (having the count of appearance larger than the calculated threshold value) does not appear in the selected image file (NO in Step S642), then in Step S644, the APP 105 increments the count of dissimilarity of the selected image file. Then, the APP 105 goes to Step S645.

Figure 11:
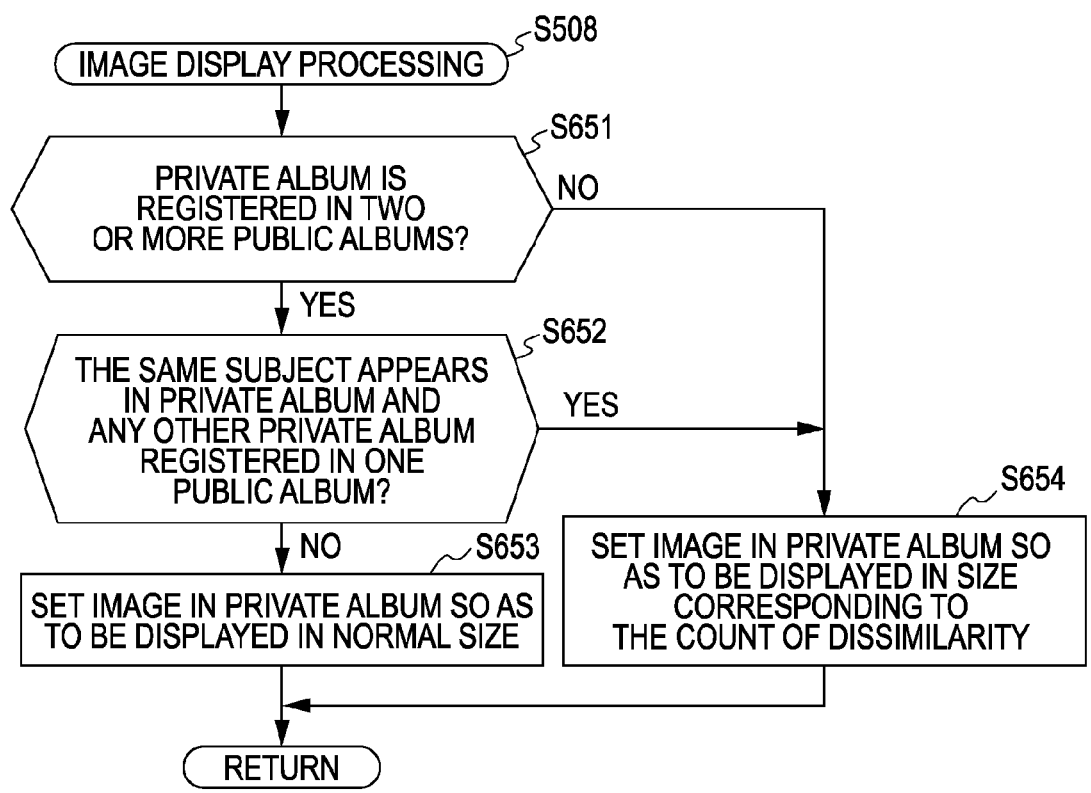
FIG. 11 is a flowchart showing in detail the operational process performed by the APP in the Web server according to the first embodiment of the present invention.

FIG. 11 is a flowchart showing in detail the image display processing in Step S508 in FIG. 6.

In Step S651, the APP 105 determines whether the private album is registered in two or more public albums. The private album here means the private album in which the image file is registered in association with the private album in Step S501 in FIG. 6 or the private album additionally registered in the public album in association with the public album in Step S509 in FIG. 6.

If the APP 105 determines in Step S651 that the private album is not registered in two or more public albums (NO in Step S651), that is, the private album is registered in one public album, then in Step S654, the APP 105 sets each image file in the private album so as to be displayed in a display size corresponding to the count of dissimilarity. The image file is set so as to be displayed in a size reduced stepwise at a predetermined reduction ratio corresponding to the count of dissimilarity. The image file is displayed in a smaller size as the count of dissimilarity is increased. If the display size corresponding to the count of dissimilarity becomes smaller than a predetermined size, the APP 105 does not display the image file and terminates the image display processing in FIG. 11.

If the APP 105 determines in Step S651 that the private album is registered in two or more public albums (YES in Step S651), then in Step S652, the APP 105 determines whether any other private album including the subject identical to the subject in the private album exists. Specifically, the APP 105 retrieves another private album registered in one public album as another private album including the subject identical to the subject in the private album. If the APP 105 retrieves any other private album registered in one public album (YES in Step S652), then in Step S654, the APP 105 sets each image file in the private album so as to be displayed in a display size corresponding to the count of dissimilarity. Then, the APP 105 terminates the image display processing in FIG. 11.

If the APP 105 determines in Step S652 that any other private album including the subject identical to the subject in the private album does not exist (NO in Step S652), then in Step S653, the APP 105 sets the image file in the private album so as to be displayed in a normal display size (without the reduction). Then, the APP 105 terminates the image display processing in FIG. 11.

For example, it is presumed that "Album A" registered in one public album and "Album C" registered in two public albums exist in the public album. If only the subject "a" appears in the image file of "Album A" and only the subject "c1" appears in the image file of "Album C", the same subject does not appear in "Album A" and "Album C". In this case, if the private album "Album C" is specified in Step S501 or Step S509 in FIG. 6, the image in the image file of "Album C" is set so as to be displayed in the normal display size. Accordingly, the image in the image file of "Album C" is displayed in the normal display size in the client PC 102. In contrast, if the private album "Album A" is specified in Step S501 or S509 in FIG. 6, the image in the image file of "Album A" is set so as to be displayed in a display size corresponding to the count of dissimilarity. Accordingly, the image in the image file of "Album A" is displayed in the display size corresponding to the count of dissimilarity in the client PC 102.

If the subjects "a" and "c1" appear in the image file of "Album A" and the subject "c1" appears in the image file of "Album C", the same subject appears in "Album A" and "Album C". In this case, the image in the image file of "Album A" is displayed in a size corresponding to the count of dissimilarity in the client PC 102. Similarly, the image in the image file of "Album C" is displayed in a size corresponding to the count of dissimilarity.

The process flow from Step S651 to Step S653 is performed to preferably display an image in the normal display size in the initial stage of the creation of the public album because the level of similarity is inaccurate. The APP 105 determines in Step S651 whether the weighting of the count of appearance of the subject is decreased as a result of the update in Step S623 in FIG. 8. If the private album is registered in one public album, the process goes to Step S654 because the level of similarity is not affected by the weighting. If the private album is registered in two or more public albums, the process goes to Step S652 because the level of similarity is affected by the weighting. The APP 105 determines in Step S652 whether the accuracy of the level of similarity of the public album is increased. The presence of any subject identical to a subject in the private album registered in one public album means that the subjects in many private albums have been registered in the public album. Accordingly, it is estimated that the accuracy of the level of similarity is increased. If the APP 105 determines in Step S652 that any subject identical to a subject in the private album registered in one public album exists, the process goes to Step S654 because it is estimated that the accuracy of the level of similarity is high and the level of similarity is reliable. If the APP 105 determines in Step S652 that no subject identical to a subject in the private album registered in one public album exists, the process goes to Step S653 because it is estimated that the accuracy of the level of similarity is not high and the level of similarity is less reliable.

Figure 13A:
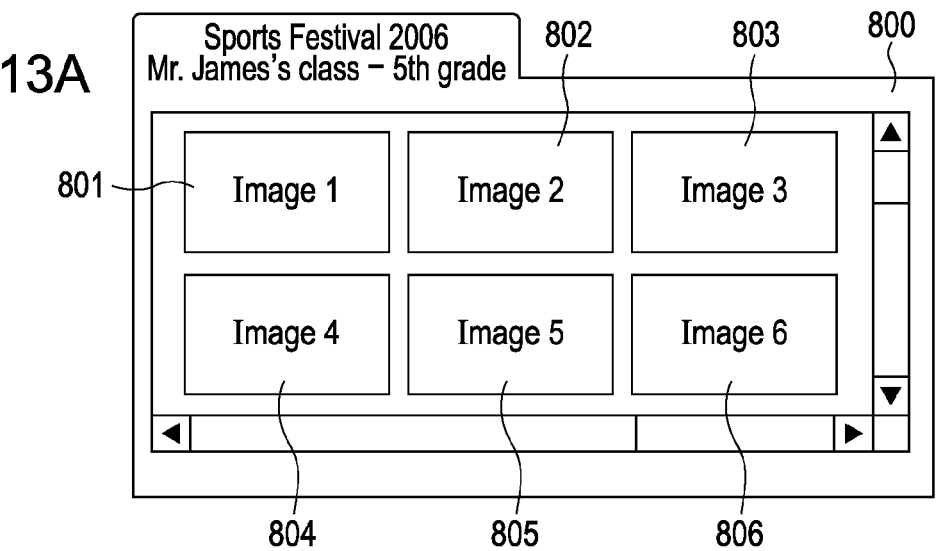
FIGS. 13A to 13C show examples of user interface screens according to the first embodiment of the present invention.
Figure 13B:
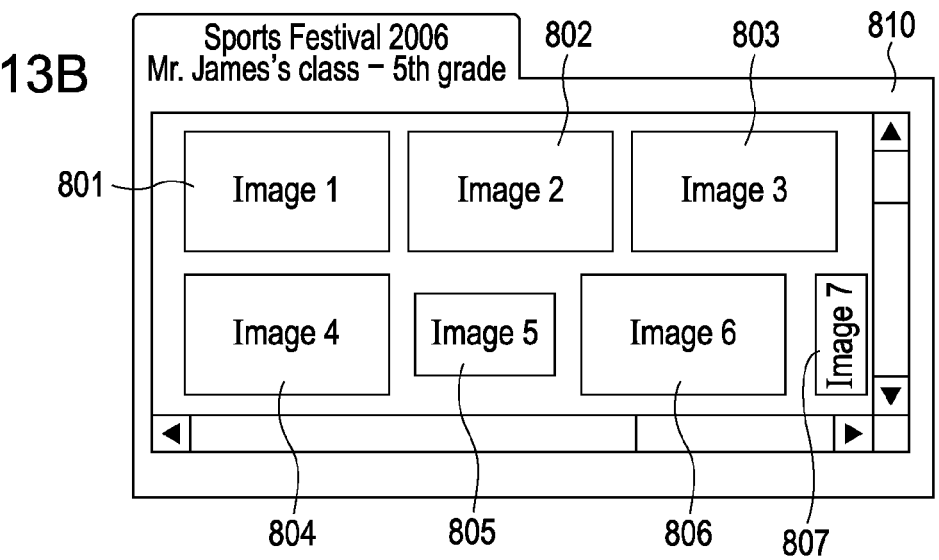
Figure 13C:
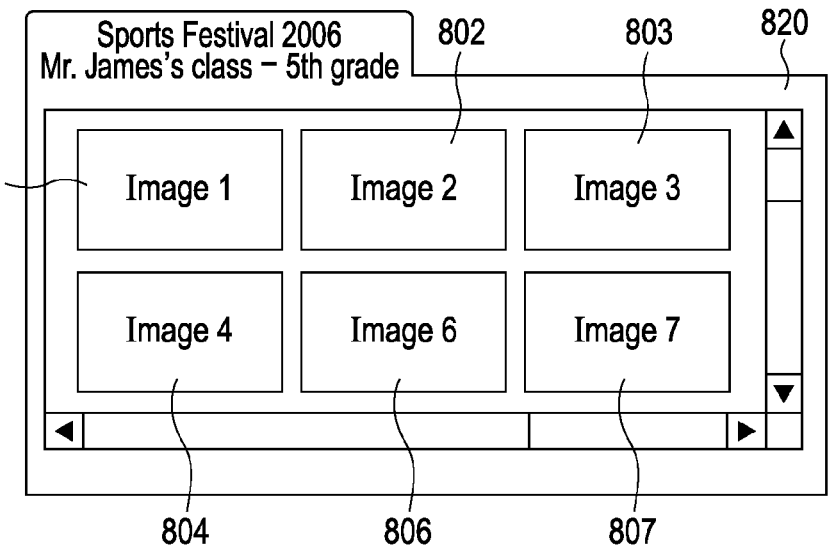

FIGS. 13A to 13C show examples of user interfaces used for displaying the public album in the Web browser 106 of the client PC 102. When a user inputs the URL of a desired public album in the Web browser 106 of the client PC 102, the client PC 102 accesses the Web server 103 to request viewing of the public album. The Web server 103 transmits an HTML file used for displaying the user interface for the public album identified by the URL to the client PC 102 in response to the request from the client PC 102. The Web browser 106 of the client PC 102 displays a user interface, such as the one shown in FIG. 13A, 13B, or 13C, in accordance with the transmitted HTML file.

When the public album stored in the DB 104 is to be viewed in the client PC 102, the Web browser 106 displays, for example, a user interface screen 800 shown in FIG. 13A. In the example shown in FIG. 13A, six images 801 to 806, among the images in the image files associated with the public album "Sports Festival 2006 Mr. James's class—5th grade", are displayed in the user interface screen 800.

If a private album (or an image file) is newly added to the public album "Sports Festival 2006 Mr. James's class—5th grade", the Web browser 106 displays, for example, a user interface screen 810 shown in FIG. 13B. The user interface screen 810 includes an image "7" 807, in addition to the six images in the user interface screen 800. If the addition of the image "7" 807 updates the threshold value (the count of appearance of the subject) in the public album and the image "5" 805 is detected as an image including the subject having the count of appearance smaller than the threshold value, that is, if the count of dissimilarity of the image "5" 805 is one or more, the image "5" 805 is displayed with being reduced in size. For example, five stepwise display sizes are provided and the display size is stepwise reduced from $4/5, \ldots, 1/5$ of the normal size to zero each time the count of dissimilarity is incremented by one. If the count of dissimilarity of the image "5" 805 is one, the image "5" 805 is displayed in a size corresponding to $4/5$ of the normal size (original size). If another image is added and the count of dissimilarity of the image "5" 805 reaches five, the display size of the image "5" 805 becomes equal to zero. In this case, the user interface screen 810 is switched to, for example, a user interface screen 820 shown in FIG. 13C, in which the image "5" 805 is not displayed.

If addition of another image in the state where the image "5" 805 is not displayed decreases the count of dissimilarity of the image "5" 805, the image "5" 805 is displayed in a size larger than the current display size. Each time addition of another image decreases the count of dissimilarity of the image "5" 805, the display size of the image "5" 805 is increased stepwise. If the count of dissimilarity of the image "5" 805 finally becomes equal to zero, the image "5" 805 is displayed in the normal size (original size), as in FIG. 13A.

In order to set the display size of the image in accordance with the count of dissimilarity, for example, <IMG src="IMG_0001.JPG" width="7" height="12"> is described in the HTML file to set stepwise the values of "width" and "height" in the <IMG> tag.

Alternatively, image files having the counts of dissimilarity larger than a predetermined value may be collectively displayed in a display area different from the display area of image files having the count of dissimilarity smaller than the predetermined value.

As described above, according to the first embodiment of the present invention, the display size corresponding to the level of the sharing (the count of dissimilarity) is set for each image file in the private album registered in association with the public album. Accordingly, when each owner of the public album views the public album, it is possible to distinctively display the image files having higher levels of sharing and the image files having lower levels of sharing in the client PC 102. In other words, only the registration of the private album in the public album by the user can realize the public album in which the image files having higher levels of sharing can be easily distinguished from the image files having lower levels of sharing.

Second Exemplary Embodiment

Figure 14:
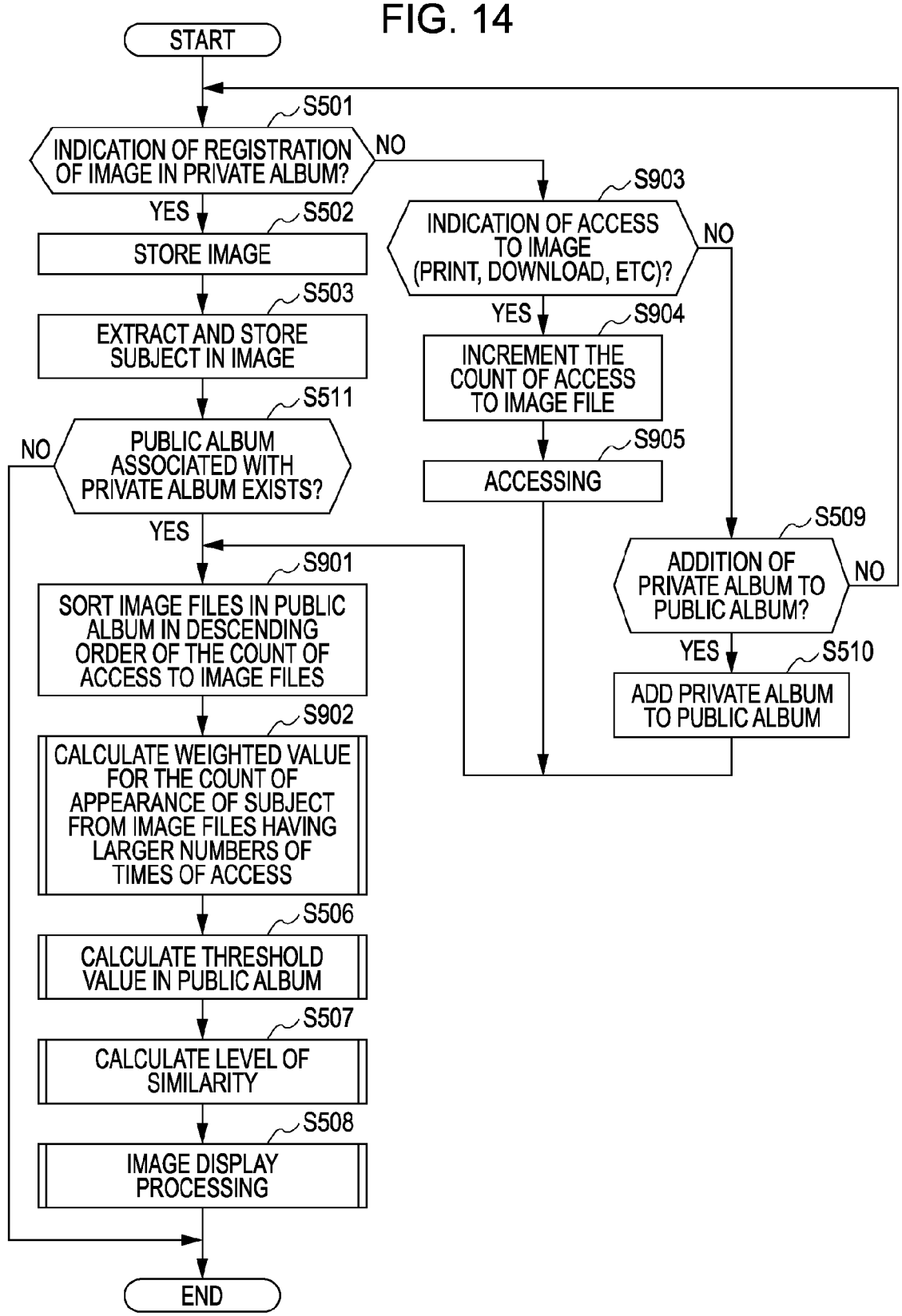
FIG. 14 is a flowchart showing an example of an operational process performed by an APP in an electronic album system to which an image display system according to a second embodiment of the present invention is applied.
Figure 15:
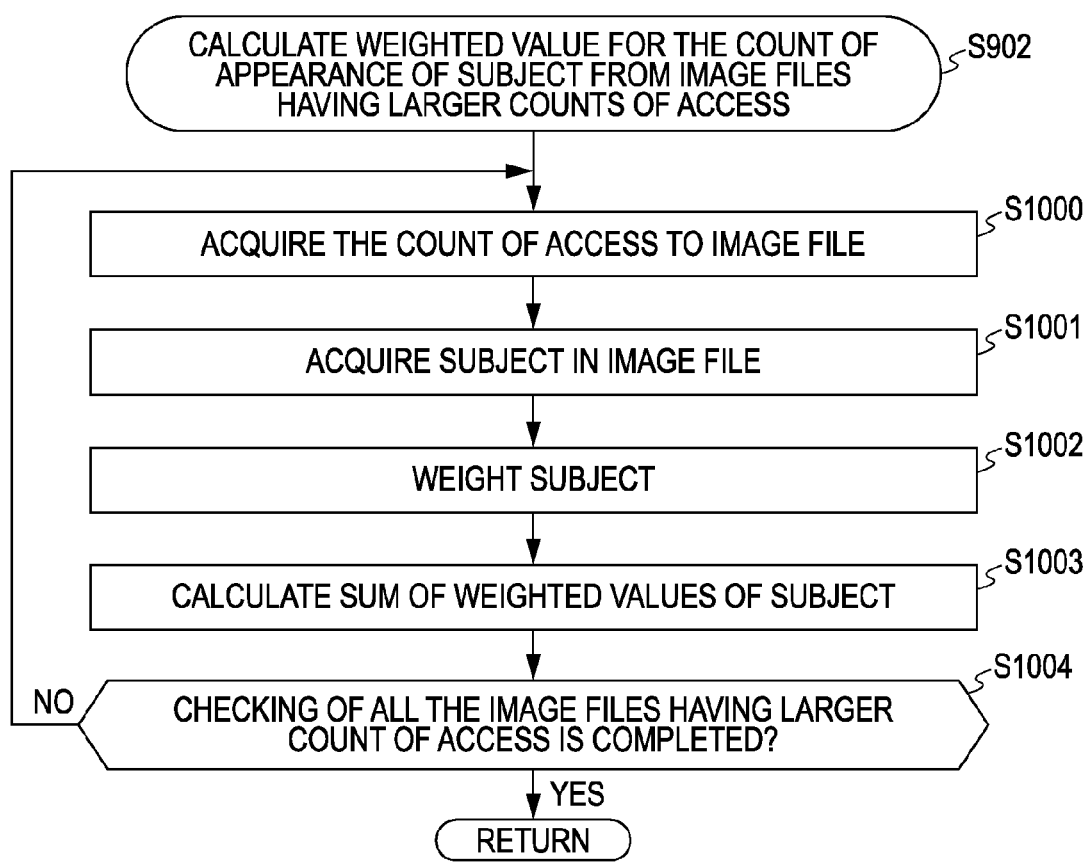
FIG. 15 is a flowchart showing in detail the operational process performed by the APP according to the second embodiment of the present invention.

A second embodiment of the present invention will now be described with reference to FIGS. 14 and 15 and FIGS. 16A and 16B. FIG. 14 is a flowchart showing an example of an operational process performed by the APP 105 in an electronic album system to which an image display system according to the second embodiment of the present invention is applied. FIG. 15 is a flowchart showing in detail a process of calculating the weighted value for each subject in each image file from image files having the larger counts of access in Step S902 in FIG. 14. FIGS. 16A and 16B are tables showing the weighted values of subjects, calculated from the image files having the larger counts of access.

The second embodiment of the present invention differs from the first embodiment of the present invention in that the count of access to each image file in a public album is used to calculate the weighted value of the image file. Accordingly, only the differences from the first embodiment of the present invention are described in the second embodiment of the present invention. A description of the processes similar to those in the first embodiment of the present invention is not repeated herein.

Referring to FIG. 14, after receiving the entity body according to the HTTP from the client PC 102, then in Step S501, the APP 105 identifies a function based on the value of the variable FUNC. If the APP 105 determines that the entity body for registering an image file in a private album is not received (NO in Step S501), the APP 105 goes to Step S903. In Step S903, the APP 105 determines whether the entity body for accessing an image file is received. The entity body for accessing an image file occurs when the owner instructs the client PC 102 to, for example, print or download the image file in the public album.

If the APP 105 receives the entity body for accessing an image file (YES in Step S903), then in Step S904, the APP 105 retrieves the image file specified by the entity body from the DB 104 to increment the count of access to the image file. The count of access is stored in, for example, a MarkerNote area in Exif information in the image file.

In Step S905, the APP 105 accesses the image file. For example, when the image file is to be downloaded, the APP 105 acquires at least one image file specified by the client PC 102 from the DB 104 and transmits the acquired image file to the client PC 102. The APP 105 then goes to Step S901. If the APP 105 does not receive the entity body for accessing an image file (NO in Step S903), then in Step S509, the APP 105 determines whether the private album is to be registered in the public album. If the APP 105 determines that the private album is to be registered in the public album (YES in Step S509), then in Step S510, the APP 105 registers the private album in the public album. The APP 105 then goes to Step S901. If the APP 105 determines that the private album is not to be registered in the public album (NO in Step S509), the APP 105 goes back to Step S501.

If the APP 105 receives the entity body for registering an image file in a private album (YES in Step S501), the APP 105 sequentially performs Steps S502, S503, and S511, as in the first embodiment of the present invention. In this case, since the weighted value of the image file is calculated based on the count of access to the image file in the public album in the second embodiment of the present invention, Step S504 in the first embodiment of the present invention is omitted in this embodiment. In other words, the count of access to the image file is determined as the feature information about the image file in the second embodiment of the present invention.

In Step S901, the APP 105 sorts the image files in the public album in descending order of the counts of access to the image files. In Step S902, the APP 105 calculates the weighted value for the count of appearance of each subject appearing in the image files from the group of the image files having the larger counts of access. The group of the image files includes the image files having the larger counts of access, among the multiple image files sorted in descending order of the count of access. The orders determined to have the larger counts of access are set in advance. For example, the orders in the top 30% are determined to have the larger counts of access.

FIG. 15 is a flowchart showing in detail the calculation of the weighted value in Step S902. In Step S1000, the APP 105 acquires the count of access to each image file included in the group of the image files having the larger counts of access. In Step S1001, the APP 105 acquires a subject in the image file, the count of access to which is acquired in Step S1000.

In Step S1002, the APP 105 weights the acquired subject by an amount corresponding to the count of access to the image file. In Step S1003, the APP 105 calculates the sum of the weighted values of the subject. In Step S1004, the APP 105 determines whether the calculation of the weighted value is completed for all the image files included in the group of the image files having the larger counts of access. If the APP 105 determines that the calculation of the weighted value is not completed for all the image files included in the group of the image files having the larger counts of access (NO in Step S1004), the APP 105 goes back to Step S1000 to repeat the calculation. If the APP 105 determines that the calculation of the weighted value is completed for all the image files included in the group of the image files having the larger counts of access (YES in Step S1004), the APP 105 terminates the calculation in FIG. 15.

Referring back to FIG. 14, after calculating the weighted value in Step S902, the APP 105 sequentially performs Steps S506, S507, and S508, as in the first embodiment of the present invention.

For example, as shown in FIG. 16A, it is presumed that the public album "Sports Festival 2006 Mr. James's class—5th grade" includes multiple images IMG_0001.JPG to IMG_0231.JPG as image files 1100 and that the count of access 1101, a photographing date/time 1002, a subject 1003, and a weighted value 1104 are associated with each image file 1100.

The counts of access to the image files IMG_0001.JPG, IMG_0002.JPG, IMG_0031.JPG, IMG_0035.JPG, and IMG_0231.JPG are "45", "43", "39", "38", and "2", respectively. A description of the counts of access to the other image files is omitted herein.

Of the subjects 1103 appearing in each image file, subjects "a" and "b" appear in the image file IMG_0001.JPG and subject "c" and "a" appear in the image file IMG_0002.JPG. The subject "c" appears in the image file IMG_0031.JPG, the subject "a" appears in the image file IMG_0035.JPG, and a subject "d" appears in the image file IMG_0231.JPG. A description of subjects appearing in the other image files is omitted herein.

The value identical to the count of access 1101 is used as the weighted value 1104 for the subject 1103. In the example in FIG. 16A, the subjects "a" and "b" appearing in the image file IMG_0001.JPG are weighted with "45" and the subjects "c" and "a" appearing in the image file IMG_0002.JPG are weighted with "43". The subject "c" appearing in the image file IMG_0031.JPG is weighted with "39", the subject "a" appearing in the image file IMG_0035.JPG is weighted with "38", and the subject "d" appearing in the image file IMG_0231.JPG is weighted with "2".

After the weighted values of the subjects appearing in all the image files in the public album "Sports Festival 2006 Mr. James's class—5th grade" are calculated by using the counts of access to the image files, the sum of the weighted values of each subject is calculated. Then, the sum of the weighted values of each subject appearing in the group of the file images having the larger counts of access, among multiple image files sorted in descending order of the count of access, is calculated.

For example, as shown in FIG. 16B, the sum of weighted values 1105 is calculated as the sum of the weighted values of each subject appearing in the image files having the counts of access corresponding to the orders in the top 30%. In the example shown in FIG. 16B, the sum of the weighted values for the subject "a" is equal to "436", the sum of the weighted values for the subject "b" is equal to "184", the sum of the weighted values for the subject "c" is equal to "245", and the sum of the weighted values for the subject "d" is equal to "57".

Then, for every subject appearing in the image files having the counts of access corresponding to the orders in the top 30%, the difference between the sum of the counts of access to the image files including the subject and the sum of the weighted values is calculated to extract two subjects having larger differences. The average of the sums of the weighted values of the two extracted subjects (the sums of the weighted values calculated from the multiple image files sorted in descending order of the count of access) is calculated and the calculated average is used as the threshold value for the public album "Sports Festival 2006 Mr. James's class—5th grade".

In the example shown in FIG. 16B, the subject "b" and "d" are extracted and the average of the sums of weighted values for the subjects "b" and "d" is calculated. The average is equal to "120.5" ((184+57)/2) that is used as the threshold value for the subject in the public album. The image files including the subjects "a", "b", and "c" have the weighted values larger the threshold value in the public album.

As described above, varying the weighted value in accordance with the count of access to the image file in the public album can realize the public album in which the image files having higher levels of sharing can be distinguished from the image files having lower levels of sharing.

Third Exemplary Embodiment

Figure 17:
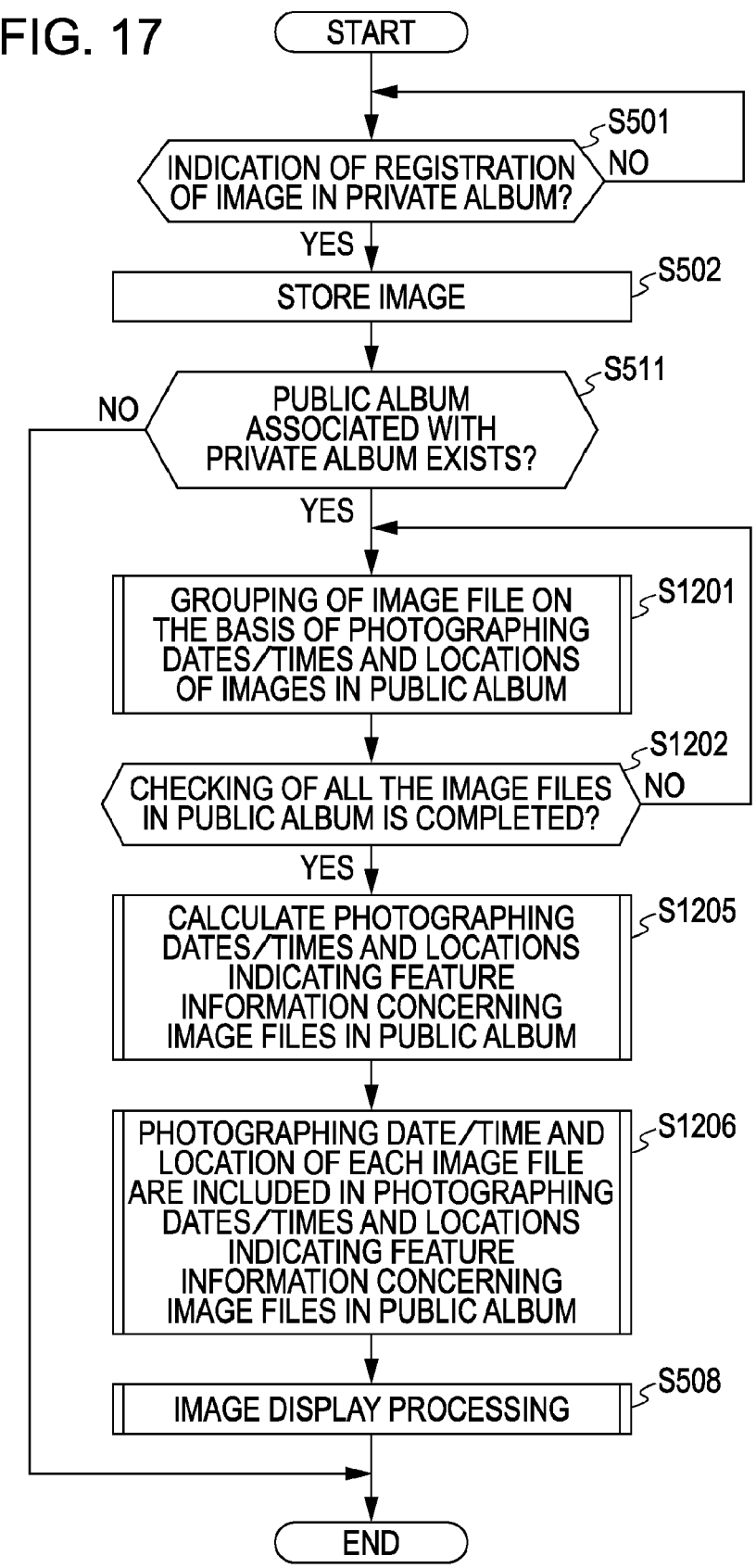
FIG. 17 is a flowchart showing an example of an operational process performed by an APP in an electronic album system to which an image display system according to a third embodiment of the present invention is applied.
Figure 18:
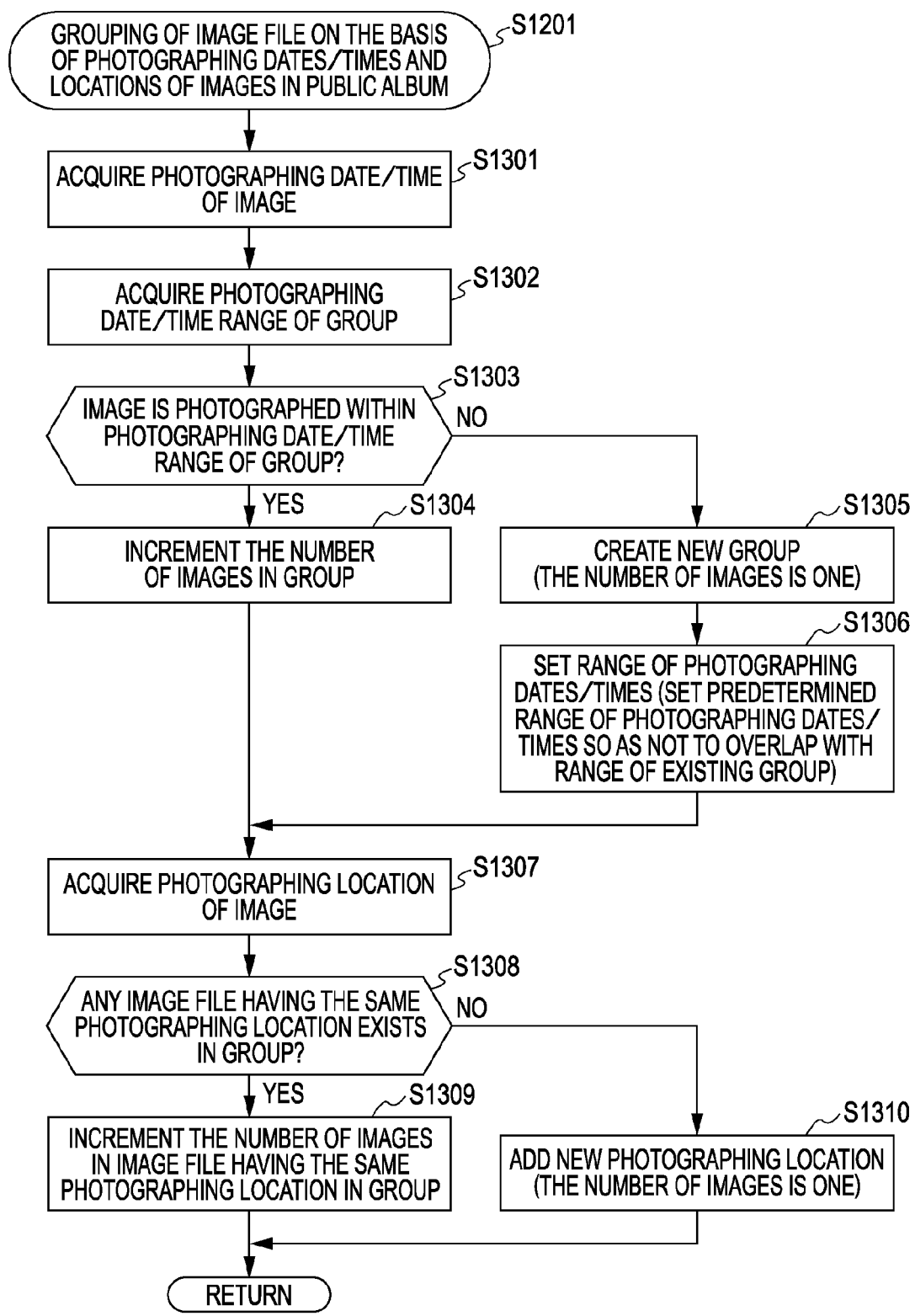
FIG. 18 is a flowchart showing in detail the operational process performed by the APP according to the third embodiment of the present invention.
Figure 19:
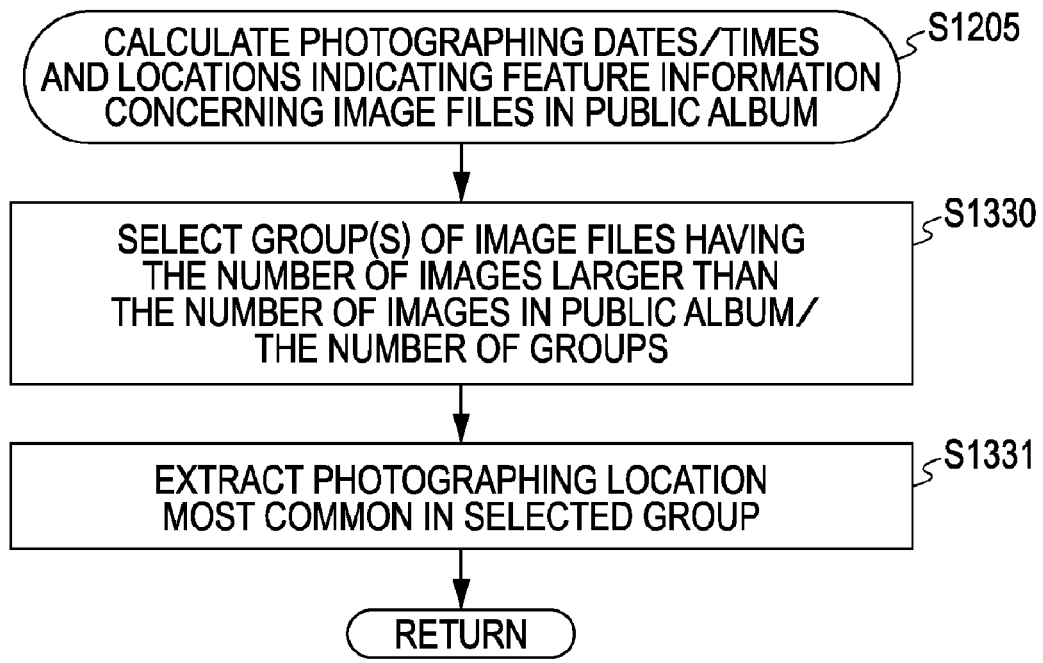
FIG. 19 is a flowchart showing in detail the operational process performed by the APP according to the third embodiment of the present invention.
Figure 20:
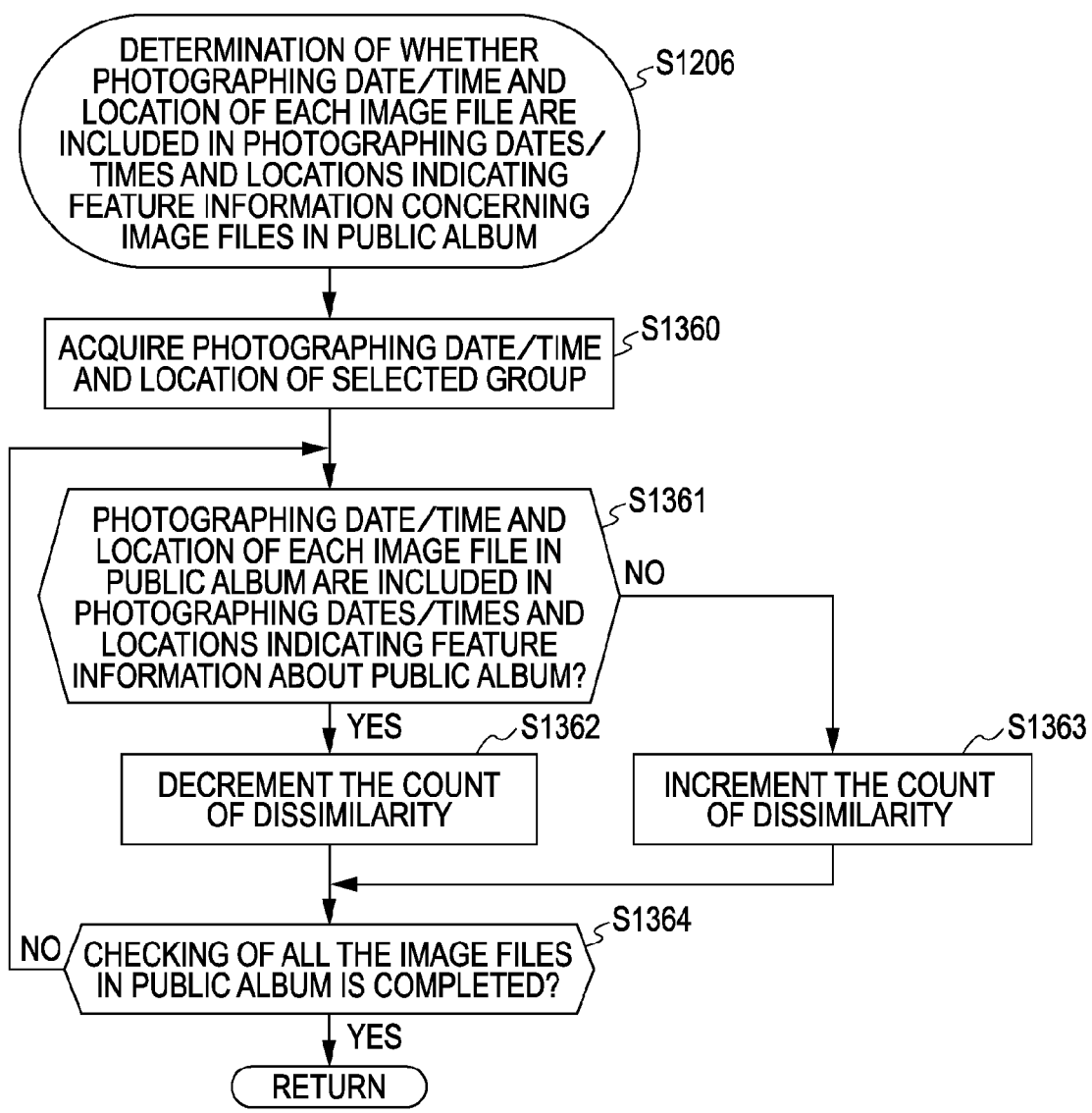
FIG. 20 is a flowchart showing in detail the operational process performed by the APP according to the third embodiment of the present invention.

A third embodiment of the present invention will now be described with reference to FIGS. 17 to 20 and FIGS. 21A and 21B. FIG. 17 is a flowchart showing an example of an operational process performed by the APP 105 in an electronic album system to which an image display system according to the third embodiment of the present invention is applied. FIG. 18 is a flowchart showing in detail a grouping process in Step S1201 in FIG. 17. FIG. 19 is a flowchart showing in detail a process of acquiring photographing information (photographing date/time and photographing location) indicating feature information about each image file in a public album in Step S1205 in FIG. 17. FIG. 20 is a flowchart showing in detail a process of determining whether the photographing date/time and location of each image file added to a private album is included in the photographing dates/times and locations of the image files in the corresponding public album in Step 1206 in FIG. 17. FIG. 21A shows an example of a list of the image files in a public album and FIG. 21B shows examples of the photographing dates/times and locations of the image files in a group.

The third embodiment of the present invention differs from the first embodiment of the present invention in that the photographing dates/times and locations of image files grouped based on the photographing date/time and location of the corresponding public album are used as feature information about image files in a private album. Accordingly, only the differences from the first embodiment of the present invention are described in the third embodiment of the present invention. A description of the processes similar to those in the first embodiment of the present invention is not repeated herein.

Referring to FIG. 17, after the APP 105 receives an entity body for registering an image file in a private album from the client PC 102 in Step S501, then in Step S502, the APP 105 registers the specified image file in the private album and stores the image file in the DB 104.

In Step S511, the APP 105 determines whether any public album associated with the private album in which the image file is registered exists. If the APP 105 determines that no public album associated with the private album in which the image file is registered exists (NO in Step S511), the APP 105 terminates the operational process in FIG. 17.

If the APP 105 determines that any public album associated with the private album in which the image file is registered exists (YES in Step S511), then in Step S1201, the APP 105 performs grouping of the image file newly registered in the private album. Specifically, the APP 105 assigns the image file newly registered in the private album to any group of image files grouped based on the photographing dates/times and locations of the image files in the public album associated with the private album. The grouping will be described in detail below with reference to FIG. 18. In Step S1202, the APP 105 determines whether the grouping of all the image files in the public album associated with the private album is completed. If the APP 105 determines that the grouping of all the image files in the public album associated with the private album is not completed (NO in Step S1202), the APP 105 goes back to Step S1201.

If the APP 105 determines that the grouping of all the image files in the public album associated with the private album is completed (YES in Step S1202), then in Step S1205, the APP 105 acquires the photographing dates/times and locations indicating the feature information about the grouped image files in the public album. The acquisition of the photographing dates/times and locations will be described in detail below with reference to FIG. 19. In Step S1206, the APP 105 determines whether the photographing date/time and location of each image file in the public album associated with the private album are included in the photographing dates/times and locations indicating the feature information about the grouped image files. The determination will be described in detail below with reference to FIG. 20.

In Step S508, the APP 105 sets a display mode of the image file newly registered in the private album based on the result of the determination. Specifically, the APP 105 sets the image file having the photographing date/time and location that are not included in the photographing dates/times and locations indicating the feature information about the grouped image files so as to be displayed in a size different from the sizes of the image files having the photographing dates/times and locations included in those indicating the feature information about the grouped image files.

FIG. 18 is a flowchart showing in detail the grouping process in Step S1201 in FIG. 17.

In Step 1301, the APP 105 acquires the photographing date/time recorded in the Exif information about the image file newly registered in the private album. In Step S1302, the APP 105 acquires the photographing date/time range of each group of the image files in the public album. The photographing date/time range of each group of the image files indicates the range of the photographing dates/times of the image files in each group. For example, the group of the image files having a photographing date/time range from 8:00 08/12/2006 to 8:30 08/12/2006 includes the image files having the photographing dates/times within a range from 8:00 08/12/2006 to 8:30 08/12/2006. If no group of the image files (or no image file) is registered in the public album, a photographing date/time range from 0:00 00/00/0000 to 0:00 00/00/0000 is set.

In Step S1303, the APP 105 determines whether the group of image files photographed within the photographing date/time range including the photographing date/time of the image file newly registered in the private album exists. If the APP 105 determines that the group of image files photographed within the photographing date/time range including the photographing date/time of the image file newly registered in the private album exists (YES in Step S1303), then in Step S1304, the APP 105 increments the number of images in the group of the image files.

If the APP 105 determines that the group of image files photographed within the photographing date/time range including the photographing date/time of the image file newly registered in the private album does not exist (NO in Step S1303), then in Step S1305, the APP 105 creates a new group of image files (including one image) to which the image file newly registered belongs. In Step S1306, the APP 105 sets the photographing date/time range of the group of the image files based on the photographing date/time of the image file belonging to the created group of image files. The photographing date/time range is set so as not to overlap with the photographing date/time range of another group of image files.

After incrementing the number of images in the group of image files (Step S1304) or after creating a new group of image files and setting the photographing date/time range (Step S1306), then in Step S1307, the APP 105 acquires the photographing location stored in the Exif information about the image file newly registered. The photographing location is stored as global positioning system (GPS) information or tag information. In Step S1308, the APP 105 determines whether any image file having the same photographing location as that of the image file exists in the group of image files to which the image file newly registered belongs. If the APP 105 determines that any image file having the same photographing location as that of the image file exists in the group of image files to which the image file newly registered belongs (YES in Step S1308), then in Step S1309, the APP 105 increments the number of images having the same photographing location in the group of image files. Then, the APP 105 terminates the grouping process in FIG. 18. If the APP 105 determines that no image file having the same photographing location as that of the image file exists in the group of image files to which the image file newly registered belongs (NO in Step S1308), then in Step S1310, the APP 105 adds the photographing location of the image file newly registered in the group of image files. Then, the APP 105 terminates the grouping process in FIG. 18.

FIG. 19 is a flowchart showing in detail the process of acquiring the photographing dates/times and locations indicating the feature information about the image files in the public album in Step S1205 in FIG. 17.

In Step S1330, the APP 105 selects one or more groups of image files having the number of images larger than a threshold value. The threshold value is given by dividing the number of images in the public album by the number of groups of image files in the public album. The APP 105 selects one or more groups including the image files of the number larger than the threshold value. The selected one or more groups of image files have the photographing dates/times indicating the feature information about the public album.

In Step S1331, the APP 105 extracts the most common photographing location from the selected one or more groups of image files. The extracted photographing location indicates the feature information about the public album. Then, the APP 105 terminates the acquisition process in FIG. 19.

FIG. 20 is a flowchart showing in detail the determination process in Step S1206 in FIG. 17.

In Step S1360, the APP 105 acquires the photographing date/time and location acquired from the selected group of image files as the feature information about the public album in Step S1205. In Step S1361, the APP 105 determines whether the photographing date/time and location stored in the Exif information about each image file in the public album are included in the photographing dates/times and locations indicating the feature information about the public album. If the image file has the photographing date/time within the photographing date/time range of any group including the image files of the number larger than the threshold value, the image file is determined to have the photographing date/time included in the photographing dates/times indicating the feature information about the public album. If the image file has the photographing location included in the photographing locations indicating the feature information about the public album, the image file is determined to have the photographing location included in the photographing locations indicating the feature information about the public album.

If the APP 105 determines that the photographing date/time and location stored in the Exif information about each image file in the public album are included in the photographing dates/times and locations indicating the feature information about the public album (YES in Step S1361), then in Step S1362, the APP 105 decrements the count of dissimilarity. If the APP 105 determines that the photographing date/time and location stored in the Exif information about each image file in the public album are not included in the photographing dates/times and locations indicating the feature information about the public album (NO in Step S1361), then in Step S1363, the APP 105 increments the count of dissimilarity.

In Step S1364, the APP 105 determines whether the checking of all the image files in the public album is completed. If the APP 105 determines that the checking of all the image files in the public album is not completed (NO in Step S1364, the APP 105 goes back to Step S1361 to repeat the above steps. If the APP 105 determines that the checking of all the image files in the public album is completed (YES in Step S1364), the APP 105 terminates the determination process in FIG. 20.

FIGS. 21A and 21B show examples indicating how to acquire the feature information (the photographing dates/times and locations) about a public album including multiple image files.

In the example shown in FIG. 21A, multiple image files IMG_0001.JPG to IMG_9999.JPG are registered in the public album as image files 1410 and the number of the image files is equal to 1,000. A photographing date/time 1411, a photographing location 1412, an exposure value (Ev) value, a photographing mode, a type of camera, GPS information, tag information, and so on are recorded in the Exif information in each image file.

The image files in the public album are classified into groups based on the photographing dates/times 1400. The classification provides groups of image files having the photographing dates/times "08:00 to 08:30 08/12/2006", "08:30 to 09:00 08/12/2006", . . . , as shown in FIG. 21B. The photographing locations of the multiple image files in the groups include AAA 1401, BBB 1402, CCC 1403, and DDD 1404.

In order to select a typical group of image files in the public album, a threshold value 1413 (=the number of the image files in the public album/the number of the groups of image files in the public album) is calculated. If the number of the image files in the public album is equal to 1,000 and the number of the groups of image files in the public album is equal to 50, the threshold value 1413 is calculated by 1,000/50=20. Accordingly, the multiple groups including 20 or more image files are selected. The photographing dates/times in the photographing date/time range of the selected groups of image files indicate the feature information about the public album. In the example shown in FIG. 21B, the groups of image files having the photographing dates/times "08:00 to 08:30 08/12/2006" to "10:00 to 10:30 08/12/2006" are selected and the photographing dates/times of the selected groups of image files indicate the feature information about the public album.

Then, the most common photographing location is extracted from among the selected groups of image files, and the extracted photographing location indicates the feature information about the public album. In the example shown in FIG. 21B, AAA 1401 is extracted as the most common photographing location.

It is determined whether the photographing date/time and location of each image file in the public album are included in the calculated photographing dates/times and locations indicating the feature information about the public album. The display modes of the image files are set in accordance with the determination result.

For example, it is presumed that there is a public album of Mr. James's class—5th grade, owned by multiple owners. It is highly possible that each owner photographs the pupils in Mr. James's class—5th grade at approximately the same photographing date/time and location while the pupils participate in a competition. In other words, it is highly possible that many image files including images captured at approximately the same photographing date/time and location are registered in the public album. As a result, the many image files are displayed when the public album is viewed.

In contrast, even if the image files of pupils in Ms. Adam's class—the 3rd grade participating in a competition are registered in the public album, the number of the image files of the pupils is small. Accordingly, the image files of pupils in Ms. Adam's class—the 3rd grade are determined not to have the feature information about the public album and, therefore, the image files are not displayed.

Consequently, it is possible to provide the public album in which the image files having higher level of sharing can be distinguished from the image files having lower level of sharing.

Although the cases in which the image files are registered in the private album are described in the third embodiment of the present invention, the display mode is set for every image file stored in the private album also when the private album is added to the public album as in the first embodiment of the present invention.

Although not shown, various pieces of information including photographing conditions (for example, the Ev value) and photographing modes (for example, a sports mode) may be acquired as the feature information about the public album to vary the display mode of each image file based on whether the image file has the feature information.

For example, many owners photograph the pupils in Mr. James's class—5th grade who participate in a footrace in a sports mode having a higher shutter speed. In contrast, it is not necessary to photograph the pupils in Ms. Adam's class—the 3rd grade who wait for start of a competition in the sports mode and the owners often photograph the pupils in another photographing mode. Since the level of sharing can be distinguished based on the photographing mode, the sports mode may be added to the feature information about the public album, in addition to the photographing date/time and location.

Fourth Exemplary Embodiment

According to a fourth embodiment of the present invention, sharing of image files between users who are familiar with each other and indication of update of the image files to each user at appropriate timing will be described.

System Configuration

Figure 22:
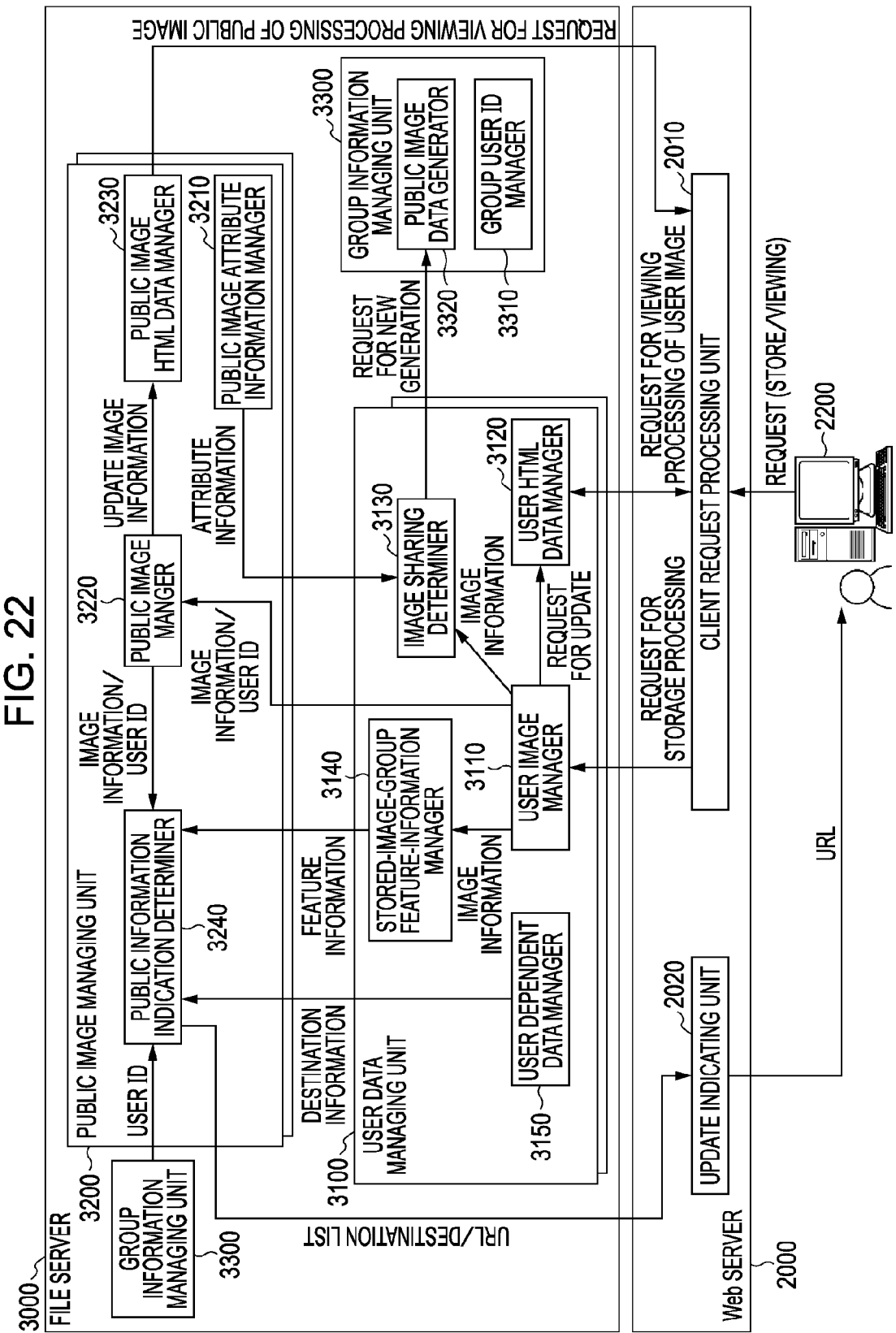
FIG. 22 is a block diagram showing an example of the configuration of an image management system including an image management apparatus according to a fourth embodiment of the present invention.

FIG. 22 is a block diagram showing an example of the configuration of an image management system including an image management apparatus according to the fourth embodiment of the present invention.

The image management system includes a Web server 2000 communicating with a client computer 2200 and a file server 3000 managing a variety of data including image information. The Web server 2000 includes a client request processing unit 2010 and an update indicating unit 2020. The client request processing unit 2010 processes requests for, for example, image viewing and image storage from the client computer 2200. The update indicating unit 2020 indicates update of public image information described below to the client.

The file server 3000 includes a user data managing unit 3100, a public image managing unit 3200, and a group information managing unit 3300. The user data managing unit 3100 manages data concerning each user. The public image managing unit 3200 manages images shared between multiple users. The group information managing unit 3300 manages information (group information) concerning groups each including multiple users.

The user data managing unit 3100 includes a user image manager 3110, a user HTML data manager 3120, an image sharing determiner 3130, a stored-image-group feature-information manager 3140, and a user dependent data manager 3150.

The user image manager 3110 receives a request for storage processing of an image from the client request processing unit 2010 and stores the data as image data for the client. The user HTML data manager 3120 manages the image data in an HTML format supporting a Web request in response to an update request from the user image manager 3110 and supplies the HTML data to the client request processing unit 2010. The image sharing determiner 3130 receives the stored image information from the user image manager 3110 and determines whether the image is shared in a manner described below. The stored-image-group feature-information manager 3140 receives the stored image information from the user image manager 3110 and manages feature information extracted from all the images stored in the user image manager 3110. The user dependent data manager 3150 manages destination information, such as a mail address, and a user ID allocated to each user, which are used for indicating information to the user.

The public image managing unit 3200 includes a public image attribute information manager 3210, a public image manager (public album) 3220, a public image HTML data manager 3230, and a public information indication determiner 3240.

The public image attribute information manager 3210 manages attribute information concerning a public image to be shared. The public image manager 3220 stores the image information received from the user image manager 3110 of each user as a public image. The public image HTML data manager 3230 receives the image information from the public image manager 3220, manages the image data in an HTML format supporting a Web request, and supplies the HTML data to the client request processing unit 2010. The public information indication determiner 3240 determines whether the update information in the public image HTML data manager 3230 is indicated to a user who belongs to the group and who is not a provider of the image information. The public image managing unit 3200 includes identification information (not shown) corresponding to multiple public image management IDs managed by the group information managing unit 3300 described below.

The group information managing unit 3300 includes a group user ID manager 3310 and a public image data generator 3320. The group user ID manager 3310 manages multiple users in a group by using the user IDs managed by the user dependent data manager 3150 as keys. The public image data generator 3320 generates new public image data shared between the multiple users managed by the group user ID manager 3310.

Management Information in Group User ID Manager

Information managed by the group user ID manager 3310 in FIG. 22 will now be described with reference to FIG. 23.

FIG. 23 is a table showing an example of the content of a group user ID management table according to the fourth embodiment of the present invention.

A table 2340 is used to manage the correspondence between multiple groups and the users in the groups.

The table 2340 includes a group ID column 2310 showing the ID of each group. Groups of m number (gr001 to grM) are managed in the table 2340 in FIG. 23. The table 2340 also includes a user ID column 2320 in which the user IDs of the users included in each group shown in the group ID column 2310 are shown. For example, the group having the group ID "gr001" includes four users ("usr001", "usr002", "usr003", and "usr005").

The table 2340 also includes a public image manager ID column 2330 in which the IDs of the public image managers 3220 used between the users included in each group shown in group ID column 2310 are shown. For example, two public image managers ("share001" and "share002") are used between the users included in the group "gr001".

Summary of Characteristic Operation

Characteristic operations according to the fourth embodiment of the present invention will now be described with reference to FIGS. 24 and 25.

Figure 24:
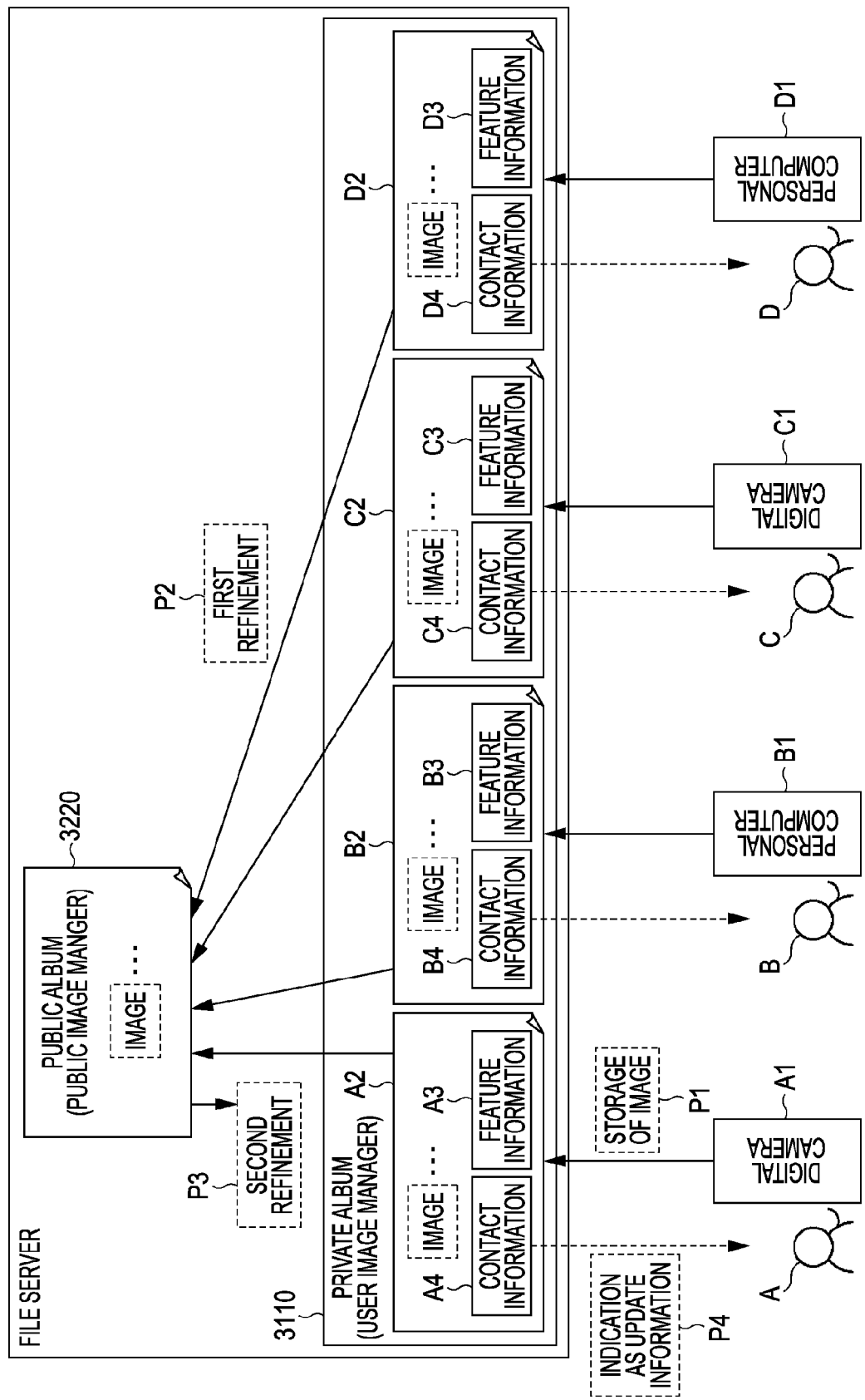
FIG. 24 illustrates a characteristic process according to the fourth embodiment of the present invention.

FIG. 24 illustrates a characteristic process according to the fourth embodiment of the present invention.

Images photographed by users A to D belonging to an acquaintance group are registered in the user image manager 3110 as private albums A2 to D2. The images are uploaded from digital cameras A1 and C1 and personal computers B1 and D1 ("P1" in FIG. 24).

The stored-image-group feature-information manager 3140 in the user data managing unit 3100 manages feature information A3 to D3 extracted from the photographed images in association with the private albums A2 to D2, respectively. The pieces of the feature information A3 to D3 each include at least one piece of information. The user dependent data manager 3150 manages contact information A4 to D4 to the users A to D, such as mail addresses.

The image sharing determiner 3130 detects a photographed image similar to the photographed images that have been shared and that are stored in the public image manager 3220 in, for example, the photographing date/time and location from the photographed images in the private albums A2 to D2. The image sharing determiner 3130, then, updates the photographed images registered in the public image manager 3220 as a public album. In order to automatically share the images, refinement (first refinement) is performed to the photographed images in the private albums A2 to D2 (P2 in FIG. 24).

The image sharing determiner 3130 extracts feature information from the photographed images in the public album, which are newly shared, to compare the extracted feature information with the feature information about all the photographed images in the private album. The image sharing determiner 3130 determines whether the update information is to be indicated to a specified contact address based on the comparison result. In order to automatically share the images, further refinement (second refinement) is performed to the photographed images in the public album (P3 in FIG. 24).

Then, the image sharing determiner 3130 indicates the public image information extracted by the first refinement "P2" to the user as update information about the public album at a time when the second refinement "P3" is indicated (P4 in FIG. 24).

An example in which the image management system according to the fourth embodiment of the present invention is used in a school sports festival will now be described.

Figure 25:
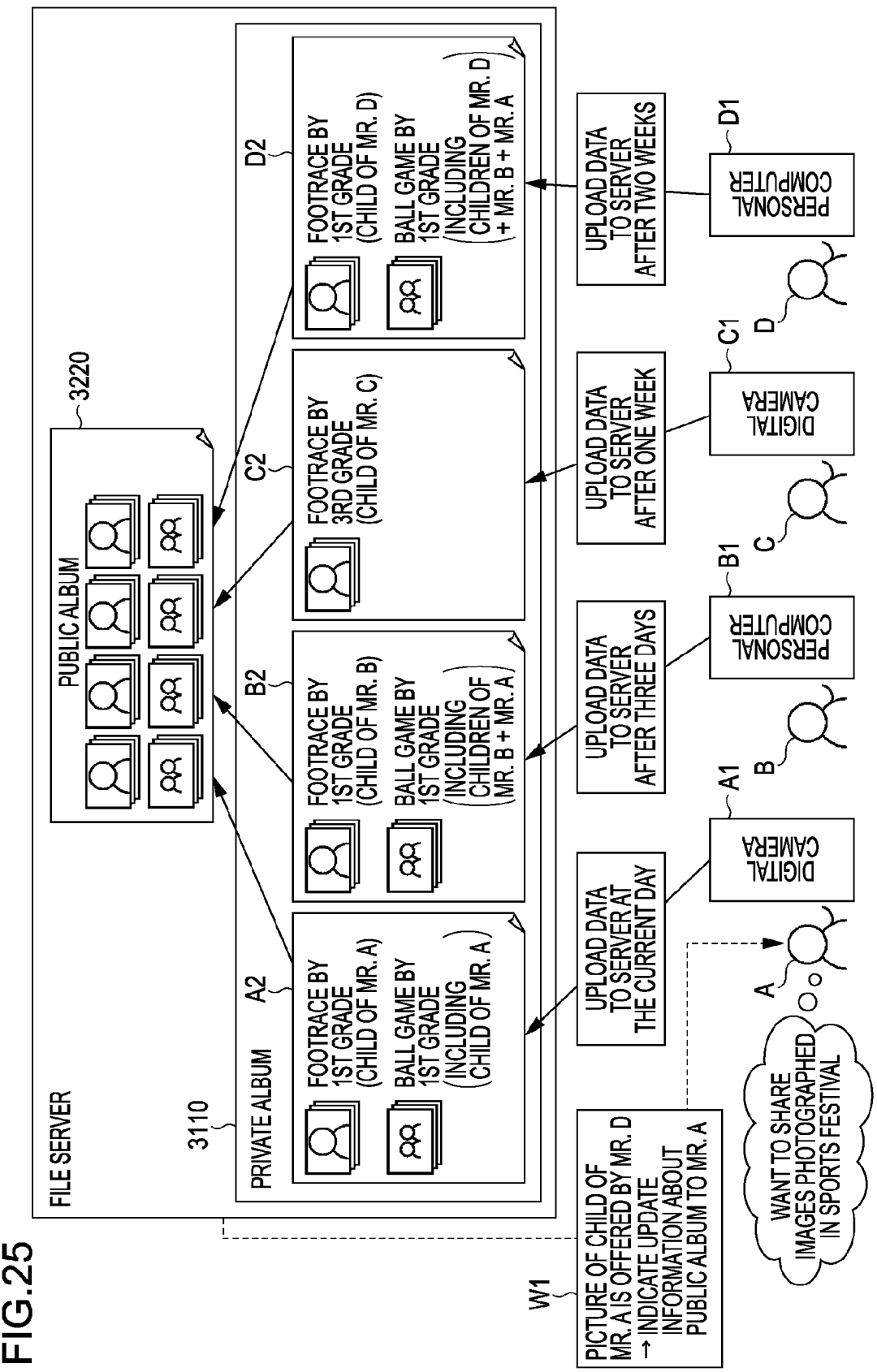
FIG. 25 illustrates how to use the image management system according to the fourth embodiment of the present invention.

FIG. 25 illustrates how to use the image management system according to the fourth embodiment of the present invention.

Images photographed at the sports festival are stored in private albums. Images of scenes at the same times and locations are shared and automatically stored in a public album.

For example, the user A uploads images photographed with the digital camera A1 at the day of the sports festival to the file server 3000 and stores the images in the private album A2. These images include scenes of "Footrace by 1st grade (a child of the user A)" and "Ball game by 1st grade (including the child of the user A)". At this time, images photographed at the sports festival are not stored in the private album A2 to D2 of the users A to D, who belong to a group. Accordingly, the images photographed by the user A are not shared and are not indicated to the other members (users B to D) in the group.

The user B uploads images photographed with the personal computer B1 three days after the sports festival to the file server 3000 and stores the images in the private album B2. These images include scenes of "Footrace by 1st grade (a child of the user B)" and "Ball game by 1st grade (including the children of the users A and B)". At this time, since the images photographed at the sports festival are stored in the private album A2 of the user A, the images photographed by the user B are shared. In addition, since the images photographed by the user B include the image of the child of the user A, the update of the images is indicated to the user A (the second refinement).

The user C uploads images photographed with the digital camera C1 one week after the sports festival to the file server 3000 and stores the images in the private album C2. These images include scenes of "Footrace by 3rd grade (a child of the user C)". At this time, since the images photographed at the sports festival are stored in the private albums A2 and B2 of the users A and B, the images photographed by the user C are shared (the first refinement). However, the images photographed by the user C do not include the images of the children of the users A and B. Accordingly, since the update information is not meaningful to the users A and B as the public information, the update of the images is not indicated to the users A and B (the second refinement).

The user D uploads images photographed with the personal computer D1 two weeks after the sports festival to the file server 3000 and stores the images in the private album D2. These images include scenes of "Footrace by 1st grade (a child of the user D) and "Ball game by 1st grade (including the children of the users D, B, and A)". At this time, since the images photographed at the sports festival are stored in the private albums A2, B2, and C2 of the users A, B, and C, the images photographed by the user D are shared (the first refinement). In addition, since the images photographed by the user D include the image of the children of the users A and B, the update of the images is indicated to the users A and B (the second refinement).

Processes Performed by Image Management System

Processes performed by the image management system according to the fourth embodiment of the present invention will now be described with reference to flowcharts shown in FIGS. 26 to 29. The program code executing the processes in the flowcharts is stored in the memories of the file server 3000 and the Web server 2000 and is executed by the CPUs of the file server 3000 and the Web server 2000.

Image Storage and Sharing by Image Management System

Figure 26:
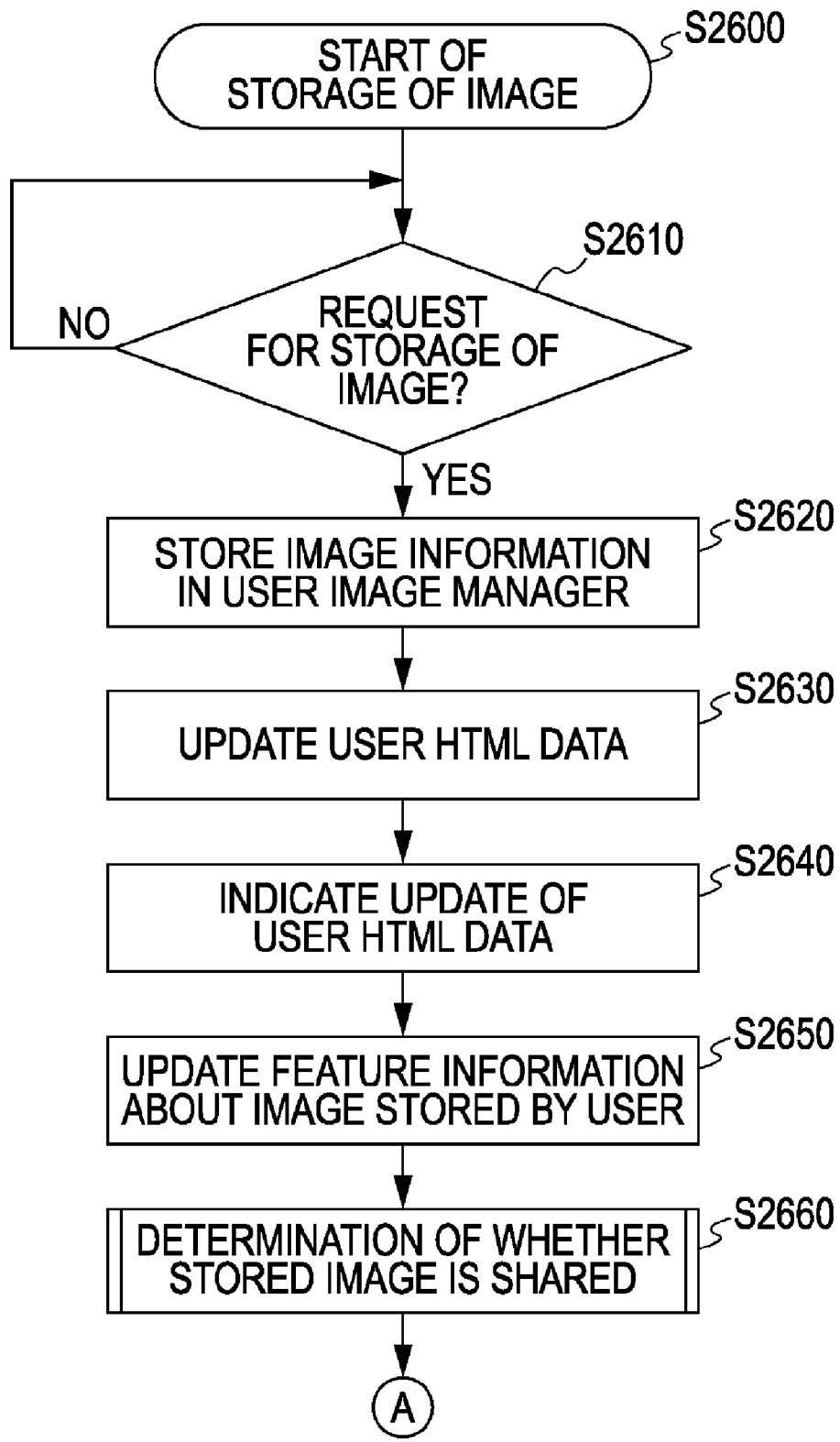
FIG. 26 is a first flowchart showing an example of an image storage process and a sharing process according to the fourth embodiment of the present invention.
Figure 27:
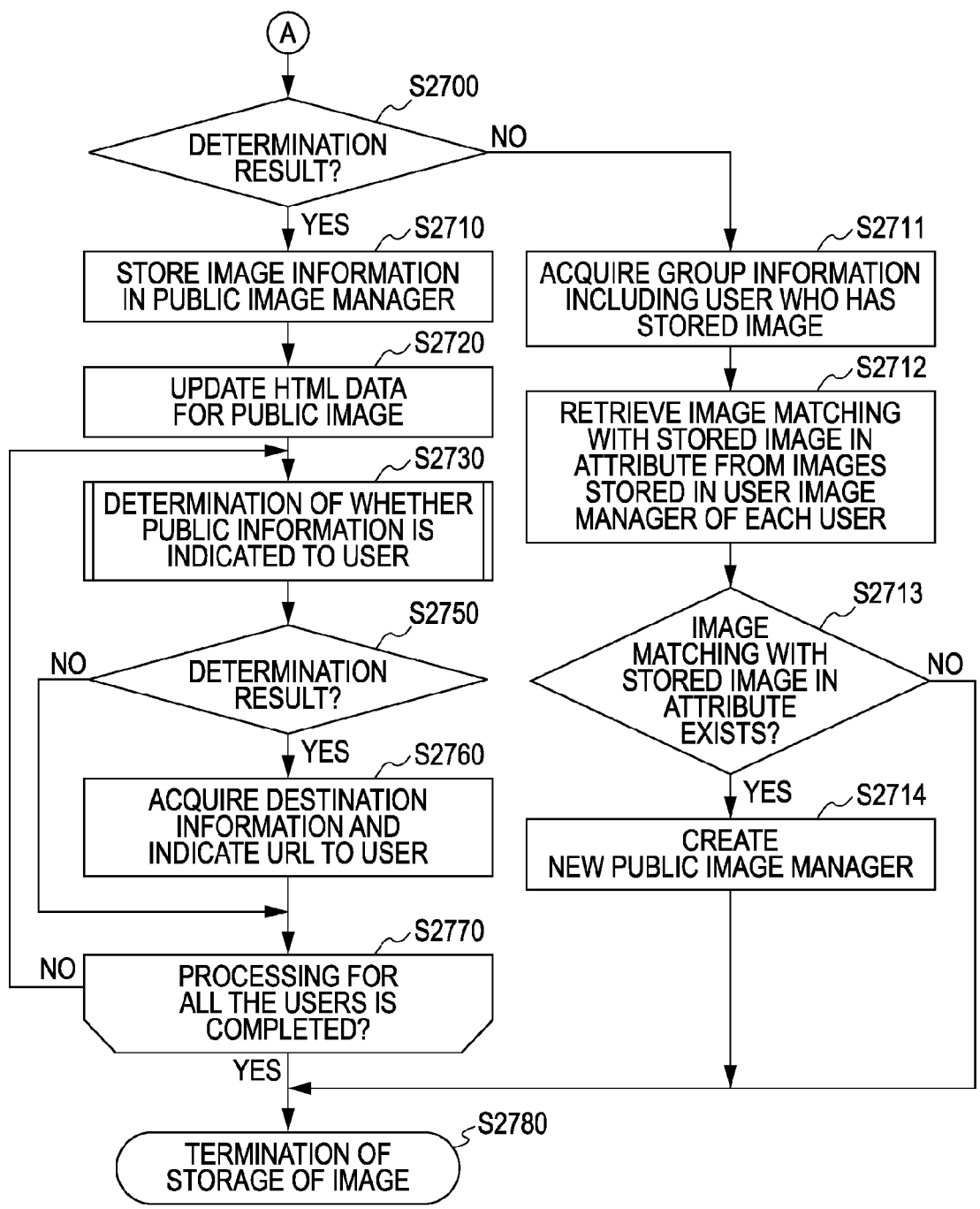
FIG. 27 is a second flowchart showing the example of the image storage process and the sharing process according to the fourth embodiment of the present invention.

FIGS. 26 and 27 are flowcharts showing examples of an image storage process and a sharing process according to the fourth embodiment of the present invention.

Referring to FIG. 26, in Step S2600, the process starts the image storage process according to the fourth embodiment of the present invention. In Step S2610, the client request processing unit 2010 determines whether an image storage request is submitted from the user. If the client request processing unit 2010 determines that an image storage request is submitted from the user (YES in Step 2610), the process goes to Step S2620.

In Step S2620, the user image manager 3110 stores the image information corresponding to the image storage request in Step S2610. In Step S2630, the user HTML data manager 3120 updates the image viewing HTML file for the user. In Step S2640, the process supplies the file updated in Step S2630 to the client request processing unit 2010 in response to an image viewing request from the user.

In Step S2650, the stored-image-group feature-information manager 3140 extracts feature information from the group of the image files that are managed by the user image manager 3110 and that have been stored by the user and manages the extracted feature information. For example, feature information about the face of a person, who is the subject and who has the largest count of appearance, feature information about the faces of persons who have larger counts of appearance, or feature information about the faces of all the persons appearing in the group of stored image files is used. The feature information is extracted from the group of stored image files by a subject recognition technology.

In Step S2660, the image sharing determiner 3130 performs determination of whether the image stored by the user is shared between users. If the image sharing determiner 3130 determines in Step S2700 in FIG. 27 that the stored image is to be added to the public image managing unit 3200 as the public image (YES in Step S2700), the process goes to Step S2710. If the image sharing determiner 3130 determines in Step S2700 in FIG. 27 that the stored image is not to be added to the public image managing unit 3200 as the public image (NO in Step S2700), the process goes to Step S2711.

In Step S2710, the process stores the image determined to be shared in Step S2700 in the public image manager 3220. In Step S2720, the public image HTML data manager 3230 updates the image viewing HTML file for the public image.

In Step S2730, the public information indication determiner 3240 performs determination of whether the update of the image viewing HTML file for the public image is indicated to each user. If the public information indication determiner 3240 determines in Step S2750 that the update of the image viewing HTML file for the public image is indicated to each user (YES in Step S2750), the process goes to Step S2760. If the public information indication determiner 3240 determines in Step S2750 that the update of the image viewing HTML file for the public image is not indicated to each user (NO in Step S2750), the process goes to Step S2770.

In Step S2760, the process acquires the mail address information that is registered from the user dependent data manager 3150 for the target user and the update indicating unit 2020 indicates information about a URL where the image viewing HTML file for the public image is stored to the target user. In Step S2770, the process refers to the group user ID manager 3310 managed by the group information managing unit 3300 to determine whether Steps S2730 to S2760 are completed for all the users in the group including the user who has provided the image that is newly stored. If the process determines that Steps S2730 to S2760 are completed for all the users in the group (YES in Step S2770), the process goes to Step S2780 to terminate the image storage process. If the process determines that Steps S2730 to S2760 are not completed for all the users in the group (NO in Step S2770), the process repeats processing of Steps S2730 to S2760.

If the image sharing determiner 3130 determines in Step S2700 that the stored image is not to be added to the public image managing unit 3200 as the public image (NO in Step S2700), the process goes to Step S2711. In Step S2711, the process refers to the group user ID manager 3310 managed by the group information managing unit 3300 to acquire the user ID included in the group to which the user who has stored the image belongs. In Step S2712, the process retrieves an image matching with the stored image in the attribute value, such as the photographing date/time and location, from among the images that correspond to the user ID acquired in Step S2711 and that is stored in the user image manager 3110.

In Step S2713, the process determines whether any image matching with the stored image in the attribute value is retrieved. If the process determines that any image matching with the stored images in the attribute value is retrieved (YES in Step S2713), the process goes to Step S2714. If the process determines that no image matching with the stored images in the attribute value is retrieved (NO in Step S2713), the process goes to Step S2780 to terminate the image storage process. In Step S2714, the process creates a new public image managing unit 3200 that manages the image matching with the stored image in the attribute value in Step S2713 and the stored image as the public image and, then, goes to Step S2780 to terminate the image storage process.

Determination of Whether Stored Image is Shared

Figure 28:
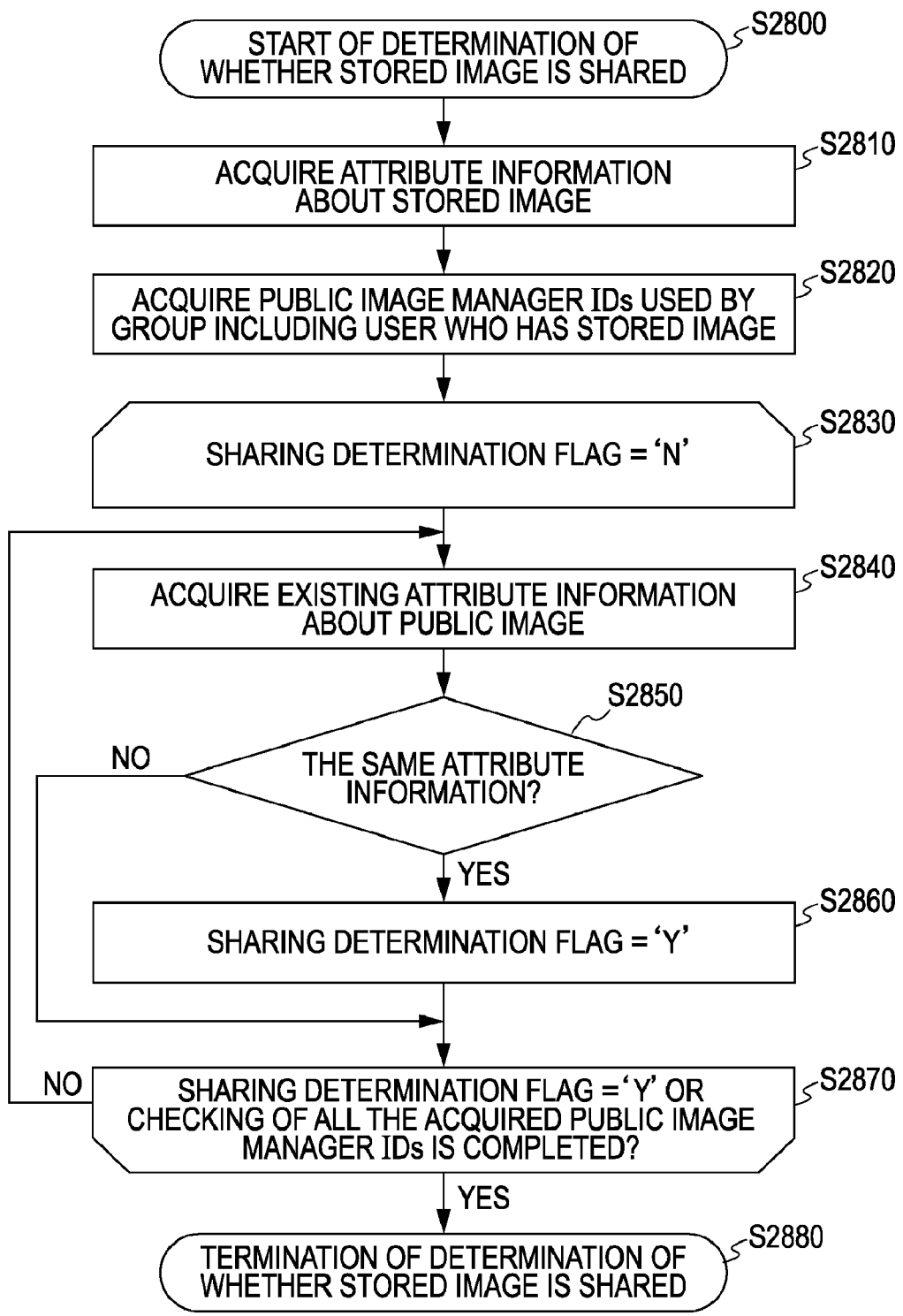
FIG. 28 is a flowchart showing in detail a process of determining whether a stored image is shared according to the fourth embodiment of the present invention.

FIG. 28 is a flowchart showing in detail the process of determining whether the stored image is shared in Step S2660 in FIG. 26.

In Step S2800, the process starts the determination of whether the stored image is shared. In Step S2810, the process acquires attribute information about the photographing date/time and location of the image newly stored in the user image manager 3110. In Step S2820, the process refers to the group user ID management table in FIG. 23 to acquire a list of the public image manager IDs 2330 used by the group including the user who has stored the image.

In Step S2830, the process sets a sharing determination flag to 'N' and repeats Steps S2840 to S2870. In Step S2840, the process acquires existing attribute information from the public image attribute information manager 3210 in the public image managing unit 3200 corresponding to the public image manager ID acquired in Step S2820.

In Step S2850, the process compares the attribute information acquired in Step S2810 with the attribute information acquired in Step S2840 to determine whether the attribute information acquired in Step S2810 coincides with the attribute information acquired in Step S2840. For example, the attribute information acquired in Step S2810 is determined to coincide with the attribute information acquired in Step S2840 if both of the pieces of the attribute information are within a predetermined threshold range. If the process determines that the attribute information acquired in Step S2810 coincides with the attribute information acquired in Step S2840 (YES in Step S2850), then in Step S2860, the process sets the sharing determination flag to 'Y' and the process proceeds to Step S2870. If the process determines that the attribute information acquired in Step S2810 does not coincide with the attribute information acquired in Step S2840 (NO in step S2850), the process goes to Step S2870. In Step S2870, the process determines whether the sharing determination flag is set to 'Y' or whether the checking of all the public image manager IDs acquired in Step S2820 is completed. If the process determines that the sharing determination flag is set to 'Y' or that the checking of all the public image manager IDs acquired in Step S2820 is completed (YES in Step S2870), the process terminates the repetition of Steps S2840 to S2870. In Step S2880, the process terminates the process of determining whether the stored image is shared. If the process determines that the sharing determination flag is not set to 'Y' and that the checking of all the public image manager IDs acquired in Step S2820 is not completed (NO in Step S2870), the process goes back to Step S2840.

Determination of Whether Public Information is Indicated

Figure 29:
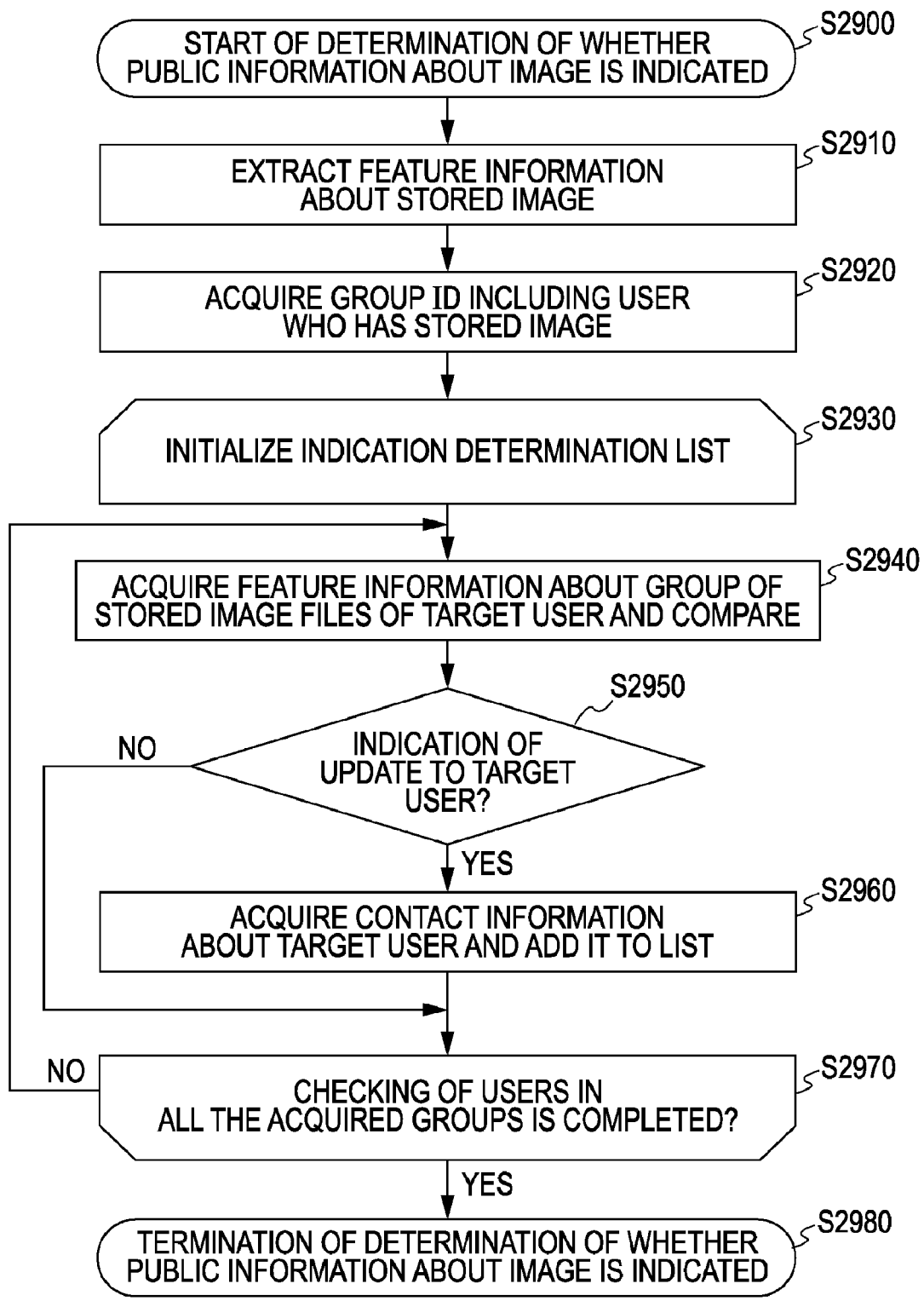
FIG. 29 is a flowchart showing in detail a process of determining whether public information is indicated to each user according to the fourth embodiment of the present invention.

FIG. 29 is a flowchart showing in detail the process of determining whether the public information is indicated to each user in Step S2730 in FIG. 27.

In Step S2900, the process starts the determination of whether the public information about the image is indicated to each user. In Step S2910, the process extracts feature information from the image that is newly shared. For example, feature information about the face of a subject appearing in the stored image is extracted by the subject recognition technology, as in Step S2650. In Step s2920, the process refers to the group information managing unit 3300 to acquire the group ID including the user ID of the user who has stored the image that is newly shared. In Step S2930, the process initializes an indication determination list and repeats Steps S2940 to S2970.

In Step S2940, the process acquires feature information from the stored-image-group feature-information manager 3140 in the user data managing unit 3100 corresponding to the one (target user) of the users having the user IDs included in the group ID acquired in Step S2920. Then, the process compares the acquired feature information with the feature information about the stored image acquired in Step S2910.

In Step S2950, the process determines whether the update of the public information is indicated to the target user based on the comparison result. For example, when the user wants to collect images of the same subject at a concert, it is determined in Step S2950 that the update of the public information is indicated to the target user in Step S2950 if the image has feature information similar to that about the stored image based on the comparison result. For example, when the user wants to widely collect images of many persons in order to create a commemorative album of a school excursion, it is determined in Step S2950 that the update of the public information is indicated to the target user in Step S2950 if the image has feature information that is not similar to that about the stored image based on the comparison result.

If it is determined that the update of the public information is indicated to the target user based on the comparison result (YES in Step S2950), in Step S2960, the process acquires a mail address as contact information from the user dependent data manager 3150 of the target user and adds the acquired mail address to the indication determination list. In Step S2970, the process determines whether the determination of the indication is completed for the users in all the groups having the group IDs acquired in Step S2920. If the process determines that the determination of the indication is completed for the users in all the groups (YES in Step S2970), the process terminates the repetition of Steps S2940 to S2970 and, then in Step S2980, the process terminates the determination of whether the public information about the image is indicated to each user. If the process determines that the determination of the indication is not completed for the users in all the groups (NO in Step S2970), the process goes back to Step S2940.

As described above, according to the fourth embodiment of the present invention, the user can automatically share the image files in a group built in the server only by storing the image files in the own private album in the file server 3000 in association with the private album. Since the update of the public information is indicated to the user depending on the shared image file, it is possible to prevent indication of the update that is not necessary for the user from being received. Consequently, the images can be effectively shared.

The present invention can be embodied by supplying a storage medium having the program code (software) realizing the functions according to the above embodiments to a system or an apparatus, the computer (or the CPU or the micro processing unit (MPU)) in which system or apparatus reads out and executes the program code stored in the storage medium.

In this case, the program code itself read out from the storage medium realizes the functions of the embodiments described above. The present invention is applicable to the program code and the storage medium having the program code stored therein.

The storage medium supplying the program code may be any storage medium, such as a flexible disk, a hard disk, a magneto-optical disk, a compact disc-read only memory (CD-ROM), a compact disc-recordable (CD-R), a compact disc-rewritable (CD-RW), a digital versatile disk-read only memory (DVD-ROM), a digital versatile disk-random access memory (DVD-RAM), a DVD-RW, a DVD+RW, a magnetic tape, a non-volatile memory card, or a ROM. Alternatively, the program code may be downloaded over a network.

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-276744 filed Oct. 10, 2006 and No. 2006-329851 filed Dec. 6, 2006, which are hereby incorporated by reference herein in their entirety.

What is claimed is:

1. An image managing apparatus comprising:
a processor which is connected to a memory, wherein the processor is programmed for:
saving images received from a client computer in association with a user ID specific to a user of the client computer;
setting a plurality of the user IDs as a group;
extracting attribute information from a new image newly saved in association with the user ID;
determining whether to save the new image further in association with the group based on the extracted attribute information of the new image;
saving the new image further in association with the group, in a case where it is decided to save the new image further in association with the group in accordance with a result of the determination;
supplying the new image saved further in association with the group to a plurality of client computers corresponding to the plurality of user IDs set as the group;
comparing a feature amount of an existing image which is already saved in association with the plurality of other user IDs set as the group and a feature amount of the new image;
selecting at least one of the plurality of other user IDs based on a result of the comparison; and
noticing the client computer corresponding to the selected other user ID by using destination information of the selected other user ID.

2. The apparatus according to claim 1, wherein the processor is further programmed for saving the new image further in association with the group in a case where the attribute information of the new image matches at least one of the attribute information of the plurality of existing images which are correlated with the group.

3. The image managing apparatus according to claim 1, wherein the processor is further programmed that the attribute information is shooting information of the image and the feature amount is an object recognition result of the image.

4. An image managing method comprising:
saving images received from a client computer in association with a user ID specific to a user of the client computer;
setting a plurality of the user IDs as a group;
extracting attribute information from a new image newly saved in association with the user ID;
determining whether to save the new image further in association with the group based on the extracted attribute information of the new image;
saving the new image further in association with the group, in a case where it is decided to save the new image further in association with the group in accordance with a result of the determination;
supplying the new image saved further in association with the group to a plurality of client computers corresponding to the plurality of other user IDs set as the group;
comparing a feature amount of an existing image which is already saved in association with the plurality of other user IDs set as the group and the feature amount of the new image; and
noticing the client computer corresponding to the selected other user ID by using destination information of the selected other user ID.

5. A computer-readable storage medium comprising:
computer executable instructions for saving images received from a client computer in association with a user ID specific to a user of the client computer;
computer executable instructions for setting a plurality of the user IDs as a group;
computer executable instructions for extracting attribute information from a new image newly saved in association with the user ID;
computer executable instructions for determining whether to save the new image further in association with the group based on the extracted attribute information of the new image;
computer executable instructions for saving the new image further in association with the group, in a case where it is decided to save the new image further in association with the group in accordance with a result of the determination;
computer executable instructions for supplying the new image saved further in association with the croup to a plurality of client computers corresponding to the plurality of other user IDs set as the group;
computer executable instructions for comparing a feature amount of an existing image which is already saved in association with the plurality of other user IDs set as the group and a feature amount of the new image;
computer executable instructions for selecting at least one of the plurality of other user IDs based on a result of the comparison; and
computer executable instructions for noticing the client computer corresponding to the selected other user ID by using destination information of the selected other user ID.

6. An image managing apparatus receiving an image from an external computer via a network, the apparatus comprising:

a processor which is connected to a memory, wherein the processor is programmed for:
- saving the image in a memory in association with a user ID specific to a user of the external computer;
- extracting a feature amount of a new image newly saved in association with the user ID;
- supplying the new image to a plurality of external computers corresponding to a plurality of other user IDs;
- searching an existing image having an extracted feature amount from among a plurality of existing images which are already saved in the memory in association with the other user IDs;
- acquiring the other user ID associated with the searched existing image; and
- noticing the external computers corresponding to the acquired other user ID by using destination information of the acquired other user ID.

7. The image managing apparatus according to claim 6, wherein the processor is further programmed for:
- saving a plurality of user IDs in a memory in association with one group ID;
- determining whether to save the new image further in association with the group ID based on attribution information of the new image; and
- informing to save the new image in association with the group ID according to the determination result and make a notice in a case where the user ID and the other user IDs are saved in association with same group ID.

8. An image managing method for receiving an image from an external computer via a network, the method comprising:
- saving the image in a memory in association with a user ID specific to a user of the external computer;
- extracting a feature amount of a new image newly saved in association with the user ID;
- supplying the new image to a plurality of external computers corresponding to a plurality of other user IDs;
- searching an existing image having an extracted feature amount from among a plurality of existing images which are already saved the memory in association with the other user IDs;
- acquiring the other user ID associated with the searched existing image; and
- noticing the external computers corresponding to the acquired other user ID by using destination information of the acquired other user ID.

9. A computer-readable storage medium comprising:
- computer executable instructions for saving the image in a memory in association with a user ID specific to a user of the external computer;
- computer executable instructions for extracting a feature amount of a new image newly saved in association with the user ID;
- computer executable instructions for supplying the new image to a plurality of external computers corresponding to a plurality of other user IDs;
- computer executable instructions for searching an existing image having an extracted feature amount from among a plurality of existing images which are already saved the memory in association with the other user IDs;
- computer executable instructions for acquiring the other user ID in association with the searched existing image; and
- computer executable instructions for noticing the external computers corresponding to the acquired other user ID by using destination information of the acquired other ID.

* * * * *